(12) United States Patent
Wang

(10) Patent No.: US 10,958,783 B2
(45) Date of Patent: Mar. 23, 2021

(54) CALL PROCESSING METHOD, TERMINAL, AND SYSTEM

(71) Applicant: Huawei Technologies Co., Ltd., Shenzhen (CN)

(72) Inventor: Bo Wang, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/346,022

(22) PCT Filed: Oct. 31, 2016

(86) PCT No.: PCT/CN2016/104141
§ 371 (c)(1),
(2) Date: Apr. 29, 2019

(87) PCT Pub. No.: WO2018/076379
PCT Pub. Date: May 3, 2018

(65) Prior Publication Data
US 2019/0245969 A1    Aug. 8, 2019

(51) Int. Cl.
| H04M 3/436 | (2006.01) |
| H04W 4/14  | (2009.01) |
| H04M 1/66  | (2006.01) |
| H04L 29/08 | (2006.01) |

(52) U.S. Cl.
CPC ............ *H04M 3/436* (2013.01); *H04L 29/08* (2013.01); *H04M 1/66* (2013.01); *H04W 4/14* (2013.01)

(58) Field of Classification Search
CPC .......... H04M 3/436; H04M 1/66; H04W 4/14
USPC ...................................................... 379/211.02
See application file for complete search history.

(56) References Cited

U.S. PATENT DOCUMENTS

| 7,283,813 B2 * | 10/2007 | Hamanaga | H04M 1/56 455/412.1 |
| 8,046,014 B2 * | 10/2011 | Donald | H04L 51/38 455/466 |
| 9,565,537 B2 * | 2/2017 | Celik | H04M 1/72519 |
| 10,313,279 B2 * | 6/2019 | DeMattei | H04L 51/04 |

(Continued)

FOREIGN PATENT DOCUMENTS

| CN | 1390071 A | 1/2003 |
| CN | 101217691 A | 7/2008 |

(Continued)

*Primary Examiner* — Ahmad F. Matar
*Assistant Examiner* — Jirapon Intavong
(74) *Attorney, Agent, or Firm* — Slater Matsil, LLP

(57) ABSTRACT

Embodiments of the present invention disclose a call processing method and a terminal. The method includes: receiving a first short message sent by a calling party, where the first short message includes an short message text, a preset flag bit, an association number, and a time, the preset flag bit is used to indicate that the short message text of the first short message indicates a reason why the calling party calls the called party, the association number includes a phone number of the calling party, and the time is a time at which the first short message is sent; determining, based on the association number and the time, an incoming call associated with the first short message; decapsulating the first short message to obtain the short message text of the first short message; and displaying the short message text in a related display interface of the incoming call.

15 Claims, 28 Drawing Sheets

| SMS message text | Preset flag bit<br>0: Rejection SMS message<br>1: Outgoing call SMS message | Time |

(56) References Cited

U.S. PATENT DOCUMENTS

| | | | |
|---|---|---|---|
| 2014/0205076 A1* | 7/2014 | Kumar | H04M 3/42042 379/142.01 |
| 2015/0004953 A1* | 1/2015 | Vendrow | H04M 3/42042 455/415 |
| 2015/0201313 A1 | 7/2015 | Celik et al. | |

FOREIGN PATENT DOCUMENTS

| | | |
|---|---|---|
| CN | 103227868 A | 7/2013 |
| CN | 104333853 A | 2/2015 |
| CN | 104580655 A | 4/2015 |
| CN | 102801864 B | 7/2015 |
| CN | 105306661 A | 2/2016 |
| CN | 105515950 A | 4/2016 |
| EP | 1686774 B1 | 8/2007 |
| JP | 2003018332 A | 1/2003 |
| JP | 2004080384 A | 3/2004 |
| JP | 2008153904 A | 7/2008 |
| JP | 2009049675 A | 3/2009 |
| JP | 2009273026 A | 11/2009 |
| JP | 2014103448 A | 6/2014 |
| JP | 2015110652 A | 6/2015 |
| JP | 2015185146 A | 10/2015 |
| KR | 20140062795 A | 5/2014 |
| KR | 20150128639 A | 11/2015 |
| KR | 20160123074 A | 10/2016 |
| KR | 20170001526 A | 1/2017 |
| WO | 2015110651 A1 | 7/2015 |
| WO | 2015110652 A1 | 7/2015 |

\* cited by examiner

Calling party (02987668100)

China Telecom

Call record interface 70

Dialing    Contacts    Yellow pages 171 8133 5517   Xi'an, Shaanxi Mobile Ringing for 10 seconds   601

Version compilation fails, please call back soon

105

Dad
Xi'an, Shaanxi Mobile   1 minute 11 seconds

Project manager
Xi'an, Shaanxi Mobile   32 seconds

Property management office
Xi'an, Shaanxi Mobile   15 seconds 1   2   3

| SMS message text | Preset flag bit<br>0: Rejection SMS message<br>1: Outgoing call SMS message | Time |

FIG. 16

CALL PROCESSING METHOD, TERMINAL, AND SYSTEM

CROSS-REFERENCE TO RELATED APPLICATIONS

This application is a national stage of International Application No. PCT/CN2016/104141, filed on Oct. 31, 2016, which is hereby incorporated by reference in its entirety.

TECHNICAL FIELD

The present invention relates to the field of mobile communications technologies, and in particular, to a call processing method, a terminal, and a system.

BACKGROUND

Initiating and answering a call is the most common means for people to communicate with each other currently.

In some cases, a called party cannot answer a call of a calling party in time, or it is inconvenient for a called party to answer a call of a calling party, but the calling party urgently expects the called party to call back as early as possible because of some important events. For example, when the calling party calls the called party because of an important event, a mobile phone of the called party is not around, and the call is automatically disconnected due to call timeout. For another example, when the calling party calls the called party because of an important event, the called party rejects the call because the called party is in a meeting.

In the prior art, after failing to answer the call of the calling party, the called party can only view a missed call and an incoming call time in a call record. The called party cannot accurately learn of a call intention of the calling party. Consequently, the called party may not call back the calling party in time. As a result, the calling party or the called party misses a best occasion for processing an important event, causing poor user experience.

In some cases, it is inconvenient for the called party to answer an incoming call of the calling party. For example, it is inconvenient for the called party to answer the call of the calling party when the called party is in a meeting. For another example, it is inconvenient for the called party to answer the call of the calling party when the called party is in class.

In the prior art, to notify the calling party of a call rejection reason, the called party may click a short message icon in an incoming call interface, and select and send a pre-stored call rejection short message, for example, "I am in a meeting", "I am in class", or user-defined short message content. The calling party may learn of the call rejection reason of the called party by using short message content sent by the called party, so that user experience is relatively friendly. However, in the prior art, a short message that indicates a call rejection reason is merely an ordinary short message, and the calling party cannot intuitively learn of a specific call-out record corresponding to the short message. Especially when viewing the short message later, the calling party needs to check a sending phone number and a sending time of the short message, to associate the short message with a specific call-out record. This is quite inconvenient.

The prior art further provides a function of viewing a recent contact event of a contact. As shown in FIG. 1, a user may view, in a contact interface or a call record details interface, all recent contact events that occur between the user and a contact sharp television (phone number: 13480960261), including short messages and call records. However, an association between a short message and a call record cannot be intuitively and accurately notified to the user in this manner. In addition, there may be no direct association between the short message and the call record. For example, in the interface shown in FIG. 1, the user cannot intuitively learn of an association between a short message received on "October 8" and two call records on "October 8". An interface shown in FIG. 2 can only present a recent contact event that occurs between the user and the contact sharp television to the user.

SUMMARY

Embodiments of the present invention provide a call processing method, a terminal, and a system, so that an incoming call and a call reason corresponding to the incoming call can be displayed on a side of a called party through association, thereby intuitively and clearly presenting the call reason of a calling party; and a rejected outgoing call and a call rejection reason corresponding to the rejected outgoing call can be displayed on a side of the calling party through association, thereby intuitively and clearly presenting the call rejection reason of the called party.

A first aspect provides a call processing method, applied to a side of a calling party. The method may include: The calling party calls a called party, and if the called party does not answer, the calling party may display a first SMS control in an outgoing call interface. The calling party may receive first input by using the first SMS control; respond to the first input to display a first SMS interface; and receive, by using the first SMS interface, a short message text entered by a user. Then, the calling party detects second input, responds to the second input to generate a first short message by using the short message text, and sends the first short message to the called party.

A second aspect provides a call processing method, applied to a side of a called party. The method may include: The called party receives a first short message sent by a calling party; determines, based on the time in the first short message, an incoming call corresponding to the first short message; and then displays, through association, a short message text of the first short message and the incoming call corresponding to the first short message.

With reference to the first aspect or the second aspect, the first short message may include the short message text, a preset flag bit, and the time, the preset flag bit is used to indicate that the short message text of the first short message is a reason why the calling party calls the called party, and the time is a call-out time at which the calling party calls the called party.

In specific implementation, the short message text of the first short message may include a text form such as a word, a voice, or a picture.

With reference to the first aspect or the second aspect, in some embodiments, the short message text of the first short message may include a keyword, and the keyword is used to receive a user operation to open an application corresponding to the keyword. For example, a keyword indicating a place name may be used to receive a user click operation to open a map application and display positioning of the place name. For another example, a keyword indicating a time may be used to receive a user click operation to open a calendar. For still another example, a keyword indicating a phone number may be used to receive a user click operation to open a phone dial pad (the phone number is automatically set in the dial pad). The examples are merely some implementations of this embodiment of the present invention, which may be different in actual application. This shall not be construed as a limitation.

In the call processing methods described in the first aspect and the second aspect, the incoming call and the call reason corresponding to the incoming call can be displayed on the side of the called party through association, thereby intuitively and clearly presenting the call reason of the calling party.

In this embodiment of the present invention, that the called party does not answer the call may include the following cases: (1) The called party rejects the call. (2) When duration in which the calling party calls the called party exceeds a time threshold specified by a mobile communications system (such as a communications gateway), for example, 50 seconds, the called party still does not answer the call. In this embodiment of the present invention, the time threshold may be referred to as a first time value. (3) The called party is not online. For example, the called party is engaged in another call. For another example, the called party is in a power-off state. For still another example, the call is automatically forwarded to a voicemail of the called party. It should be noted that, that the called party does not answer the call is not limited to the foregoing several cases. In actual application, the called party may not answer in time because of another reason. For example, the call is limited or air channel resources are insufficient.

In some embodiments, the called party may search an incoming call record for an incoming call whose incoming call time is consistent with the time in the first short message, and determine that the found incoming call is the incoming call corresponding to the first short message.

In this embodiment of the present invention, the called party may display, through association in at least one of the following manners, the first short message and the incoming call corresponding to the first short message.

In a first manner, the called party may display, through association in a lock screen interface, the short message text of the first short message and incoming call information of the incoming call corresponding to the first short message.

In a second manner, the called party may display, through association in a call record interface, the short message text of the first short message and incoming call information of the incoming call corresponding to the first short message.

In a third manner, the called party may display, through association in a system notification interface, the short message text of the first short message and incoming call information of the incoming call corresponding to the first short message.

In some embodiments, that the called party does not answer the call may further include the following case: When duration in which the calling party calls the called party exceeds a second time value, for example, 5 seconds, the called party still does not answer the call. Compared with the first time value, the second time value is smaller. If the duration in which the calling party calls the called party exceeds the first time value, the call immediately ends. If the duration in which the calling party calls the called party exceeds the second time value but does not reach the first time, the call continues.

In specific implementation, when the duration in which the calling party calls the called party exceeds the second time value, and the called party still does not answer the call, a first SMS control 101 may be displayed in an outgoing call interface 10 of the calling party. Therefore, the calling party may open the first SMS interface by using the first SMS control 101 in a call process; enter, in the first SMS interface, the short message text that indicates the call reason; and finally send the first short message. In this case, the short message text of the first short message is displayed in an incoming call interface 20 of the called party, namely, the call reason of the calling party, so that the called party may learn of the call reason of the calling party when receiving the incoming call of the calling party, and therefore the called party immediately answers the call.

In some embodiments, the calling party may display the short message text of the first short message in a call record interface. In other words, the calling party may record and display the call reason why the calling party calls the called party. Therefore, the calling party reviews call reasons corresponding to all outgoing calls, especially an outgoing call in which a contact name of the called party is not stored (only a phone number is displayed in a call record), and a call reason corresponding to the outgoing call can help the calling party learn of more information about the called party and the outgoing call.

A third aspect provides a call processing method, applied to a side of a called party. The method may include: The called party receives an incoming call of a calling party, and displays a second SMS control in an incoming call interface. The called party may detect third input by using the second SMS control; respond to the third input to display a second SMS interface; and receive, by using the second SMS interface, a short message text entered by a user of the called party. Then, the called party detects fourth input, responds to the fourth input to generate a second short message by using the short message text, and sends the second short message to the calling party.

A fourth aspect provides a call processing method, applied to a side of a calling party. The method may include: The calling party receives a second short message sent by a called party; determines, based on the time in the second short message, an outgoing call corresponding to the second short message; and displays, through association, the short message text of the second short message and the outgoing call corresponding to the second short message.

With reference to the third aspect or the fourth aspect, the second short message may include the short message text, a preset flag bit, and the time, the preset flag bit is used to indicate that the short message text of the second short message is a call rejection reason why the called party rejects the incoming call, and the time is an incoming call time corresponding to the incoming call.

In specific implementation, the short message text of the second short message may include a text form such as a word, a voice, or a picture.

With reference to the third aspect or the fourth aspect, in some embodiments, the short message text of the second short message may include a keyword, and the keyword is used to receive a user operation to open an application corresponding to the keyword. For example, a keyword indicating a place name may be used to receive a user click operation to open a map application and display positioning of the place name. For another example, a keyword indicating a time may be used to receive a user click operation to open a calendar. For still another example, a keyword indicating a phone number may be used to receive a user click operation to open a phone dial pad (the phone number is automatically set in the dial pad). The examples are merely some implementations of this embodiment of the present invention, which may be different in actual application. This shall not be construed as a limitation.

In the call processing methods described in the third aspect and the fourth aspect, the rejected outgoing call and the call rejection reason corresponding to the rejected outgoing call can be displayed on the side of the calling party through association, thereby intuitively and clearly presenting the call rejection reason of the called party.

In some embodiments, the third input may be further used to trigger to disconnect the incoming call. The called party responds to the third input to disconnect the incoming call.

In some embodiments, the calling party may search an outgoing call record for an outgoing call whose outgoing call time is consistent with the time in the second short message, and determine that the found outgoing call is the outgoing call corresponding to the second short message.

In this embodiment of the present invention, the calling party may display, through association in at least one of the following manners, the second short message and the outgoing call corresponding to the second short message.

In a first manner, the calling party may display the short message text of the second short message in an outgoing call interface, and the outgoing call interface is configured to display the outgoing call corresponding to the second short message.

In a second manner, the calling party may display, through association in a call record, the short message text of the second short message and the outgoing call corresponding to the second short message.

In some embodiments, the called party may further display, through association in a call record interface, the short message text of the second short message and the incoming call corresponding to the second short message. In other words, the called party may also record and display the call rejection reason why the called party rejects the incoming call. Therefore, the calling party reviews call rejection reasons corresponding to all missed calls, especially a missed call in which a contact name of the calling party is not stored (only a phone number is displayed in a call record), and a call rejection reason corresponding to the missed call can help the called party learn of more information about the called party and the outgoing call.

A fifth aspect provides a terminal, applied to a calling party. The terminal may include a processor, a transmitter, and a display screen.

The transmitter is configured to call a called party.

The display screen is configured to: if the called party does not answer, enable the calling party to display a first SMS control in an outgoing call interface.

The display screen is further configured to: receive first input by using the first SMS control, and respond to the first input to display a first SMS interface.

The display screen is further configured to receive, by using the first SMS interface, a short message text entered by a user.

The display screen is further configured to detect second input.

The processor is configured to respond to the second input to generate a first short message by using the short message text.

The transmitter is further configured to send the first short message to the called party.

In some embodiments, that the called party does not answer includes: the called party rejects the call, or duration in which the calling party calls the called party exceeds a first time value, or the called party is not online.

In some embodiments, the display screen is further configured to display, through association in a call record interface, the short message text of the first short message and an outgoing call corresponding to the first short message.

A sixth aspect provides a terminal, applied to a called party. The terminal may include a processor, a receiver, and a display screen.

The receiver is configured to receive a first short message sent by a calling party.

The processor is configured to determine, based on the time in the first short message, an incoming call corresponding to the first short message.

The display screen is configured to display, through association, the short message text of the first short message and the incoming call corresponding to the first short message.

In some embodiments, the display screen is specifically configured to display, through association in a lock screen interface, the short message text of the first short message and incoming call information of the incoming call corresponding to the first short message.

In some embodiments, the display screen is specifically configured to display, through association in a call record interface, the short message text of the first short message and incoming call information of the incoming call corresponding to the first short message.

In some embodiments, the display screen is specifically configured to display, through association in a system notification interface, the short message text of the first short message and incoming call information of the incoming call corresponding to the first short message.

In some embodiments, the display screen is further configured to display the short message text of the first short message in a caller ID display interface of the incoming call corresponding to the first short message.

In some embodiments, the processor is specifically configured to search an incoming call record for an incoming call whose incoming call time is consistent with the time in the first short message, and determine that the found incoming call is the incoming call corresponding to the first short message.

With reference to the fifth aspect or the sixth aspect, the first short message may include the short message text, a preset flag bit, and the time, the preset flag bit is used to indicate that the short message text of the first short message is a reason why the calling party calls the called party, and the time is a call-out time at which the calling party calls the called party.

With reference to the fifth aspect or the sixth aspect, in some embodiments, the short message text of the first short message includes a word, a voice, or a picture.

With reference to the fifth aspect or the sixth aspect, in some embodiments, the short message text of the first short message includes a keyword, and the keyword is used to receive a user operation to open an application corresponding to the keyword.

A seventh aspect provides a terminal, applied to a called party. The terminal may include a processor, a receiver, a transmitter, and a display screen.

The receiver is configured to receive an incoming call of a calling party.

The display screen is configured to display a second SMS control in an incoming call interface.

The display screen is further configured to: detect third input by using the second SMS control, and respond to the third input to display a second SMS interface.

The display screen is further configured to receive, by using the second SMS interface, a short message text entered by a user of the called party.

The display screen is further configured to detect fourth input.

The processor is configured to respond to the fourth input to generate a second short message by using the short message text.

The transmitter is configured to send the second short message to the calling party.

In some embodiments, the processor is configured to respond to the third input to disconnect the incoming call.

In some embodiments, the display screen is further configured to display, through association in a call record interface, the short message text of the second short message and the incoming call corresponding to the second short message.

An eighth aspect provides a terminal, applied to a calling party. The terminal may include a processor, a receiver, and a display screen.

The receiver is configured to receive a second short message sent by a called party.

The processor is configured to determine, based on the time in the second short message, an outgoing call corresponding to the second short message.

The display screen is configured to display, through association, the short message text of the second short message and the outgoing call corresponding to the second short message.

In some embodiments, the display screen is specifically configured to display the short message text of the second short message in an outgoing call interface, where the outgoing call interface is configured to display the outgoing call corresponding to the second short message.

In some embodiments, the display screen is specifically configured to display, through association in a call record, the short message text of the second short message and the outgoing call corresponding to the second short message.

In some embodiments, the processor is specifically configured to search an outgoing call record for an outgoing call whose outgoing call time is consistent with the time in the second short message, and determine that the found outgoing call is the outgoing call corresponding to the second short message.

With reference to the seventh aspect or the eighth aspect, the second short message may include the short message text, a preset flag bit, and the time, the preset flag bit is used to indicate that the short message text of the second short message is a call rejection reason why the called party rejects the incoming call, and the time is an incoming call time corresponding to the incoming call.

With reference to the seventh aspect or the eighth aspect, in some embodiments, the short message text of the second short message includes a word, a voice, or a picture.

With reference to the seventh aspect or the eighth aspect, in some embodiments, the short message text of the second short message includes a keyword, and the keyword is used to receive a user operation to open an application corresponding to the keyword.

A ninth aspect provides a communications system, including a calling party and a called party.

The calling party is configured to: call the called party; and if the called party does not answer, display a first SMS control in an outgoing call interface.

The calling party is further configured to: receive first input by using the first SMS control; respond to the first input to display a first SMS interface; and receive, by using the first SMS interface, a short message text entered by a user.

The calling party is further configured to: detect second input, respond to the second input to generate a first short message by using the short message text, and send the first short message to the called party.

The called party is configured to: receive the first short message sent by the calling party; determine, based on the time in the first short message, an incoming call corresponding to the first short message; and display, through association, the short message text of the first short message and the incoming call corresponding to the first short message.

The first short message includes the short message text, a preset flag bit, and the time, the preset flag bit is used to indicate that the short message text of the first short message is a reason why the calling party calls the called party, and the time is a call-out time at which the calling party calls the called party.

In specific implementation, the calling party may be the terminal described in the fifth aspect, and the called party may be the terminal described in the sixth aspect.

A tenth aspect provides a communications system, including a calling party and a called party.

The calling party is configured to call the called party.

The called party is configured to receive an incoming call of the calling party, and display a second SMS control in an incoming call interface.

The called party is further configured to: detect third input by using the second SMS control; respond to the third input to display a second SMS interface; and receive, by using the second SMS interface, a short message text entered by a user of the called party.

The called party is further configured to: detect fourth input, respond to the fourth input to generate a second short message by using the short message text, and send the second short message to the calling party.

The calling party further receives the second short message sent by the called party; determines, based on the time in the second short message, an outgoing call corresponding to the second short message; and displays, through association, the short message text of the second short message and the outgoing call corresponding to the second short message.

The second short message includes the short message text, a preset flag bit, and the time, the preset flag bit is used to indicate that the short message text of the second short message is a call rejection reason why the called party rejects the incoming call, and the time is an incoming call time corresponding to the incoming call.

In specific implementation, the calling party may be the terminal described in the seventh aspect, and the called party may be the terminal described in the eighth aspect.

An eleventh aspect provides a readable non-volatile storage medium storing a computer instruction, and the computer instruction is executed to implement the method described in the first aspect.

A twelfth aspect provides a readable non-volatile storage medium storing a computer instruction, and the computer instruction is executed to implement the method described in the second aspect.

A thirteenth aspect provides a readable non-volatile storage medium storing a computer instruction, and the computer instruction is executed to implement the method described in the third aspect.

A fourteenth aspect provides a readable non-volatile storage medium storing a computer instruction, and the computer instruction is executed to implement the method described in the fourth aspect.

In the embodiments of the present invention, the incoming call and the call reason corresponding to the incoming call can be displayed on the side of the called party through association, thereby intuitively and clearly presenting the call reason of the calling party. In addition, the rejected outgoing call and the call rejection reason corresponding to the rejected outgoing call can be displayed on the side of the calling party through association, thereby intuitively and clearly presenting the call rejection reason of the called party.

BRIEF DESCRIPTION OF THE DRAWINGS

To describe the technical solutions in the embodiments of the present invention more clearly, the following briefly describes the accompanying drawings required for describing the embodiments.

FIG. 7 is a schematic diagram in which a calling party displays, through association in a call record, an outgoing call and a call reason corresponding to the outgoing call according to an embodiment of the present invention;

FIG. 16 is a schematic diagram of a data format of a short message according to an embodiment of the present invention;

DETAILED DESCRIPTION OF ILLUSTRATIVE EMBODIMENTS

Terms used in an implementation part of the present invention are merely intended to explain specific embodiments of the present invention, but are not intended to limit the present invention.

First, the embodiments of the present invention mainly relate to two call scenarios. In a first call scenario, a calling party calls a called party, the called party does not answer, and the calling party needs to remind the called party to call back as early as possible. In a second call scenario, a calling party calls a called party, the called party rejects the call, and the called party needs to notify the calling party of a call rejection reason.

FIG. 2A, FIG. 2B, and FIG. 3A to FIG. 3C are schematic diagrams of a call processing function for the first call scenario according to an embodiment of the present invention. The following provides detailed description.

Figure 2A:
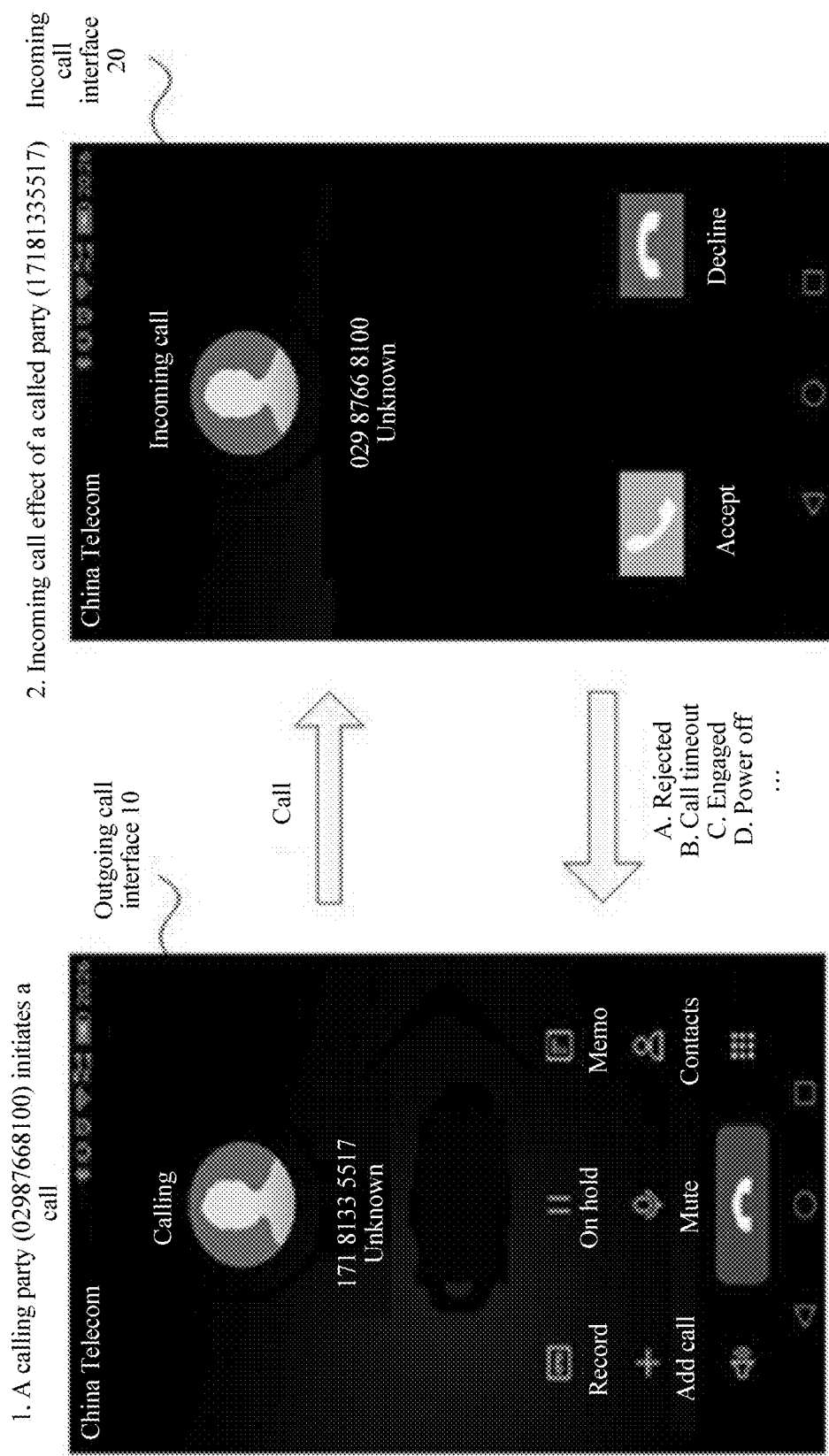
FIG. 2A is a schematic diagram of a call scenario according to an embodiment of the present invention.

FIG. 2A is a schematic diagram in which a calling party (phone number: 02987668100) calls a called party (phone number: 17181335517). An outgoing call interface 10 is displayed on a side of the calling party, and the phone number of the called party is displayed in the outgoing call interface 10. An incoming call interface 20 is displayed on a side of the called party, and the phone number of the calling party is displayed in the incoming call interface 20.

As shown in FIG. 2A, the called party does not answer the call of the calling party. On the side of the called party, the call that is not answered may be referred to as a missed call. Specifically, that the called party does not answer the call may include the following cases:

(1) The called party rejects the call. For example, as shown in FIG. 2A, a user of the called party may click a "Decline" icon in the incoming call interface 20 to disconnect the incoming call.

(2) When duration in which the calling party calls the called party exceeds a time threshold specified by a mobile communications system (such as a communications gateway), for example, 50 seconds, the called party still does not answer the call. In this embodiment of the present invention, the time threshold may be referred to as a first time value.

(3) The called party is not online. For example, the called party is engaged in another call. For another example, the called party is in a power-off state. For still another example, the call is automatically forwarded to a voicemail of the called party.

It should be noted that, that the called party does not answer the call is not limited to the foregoing several cases. In actual application, the called party may not answer in time because of another reason. For example, the call is limited or air channel resources are insufficient.

Figure 2B:
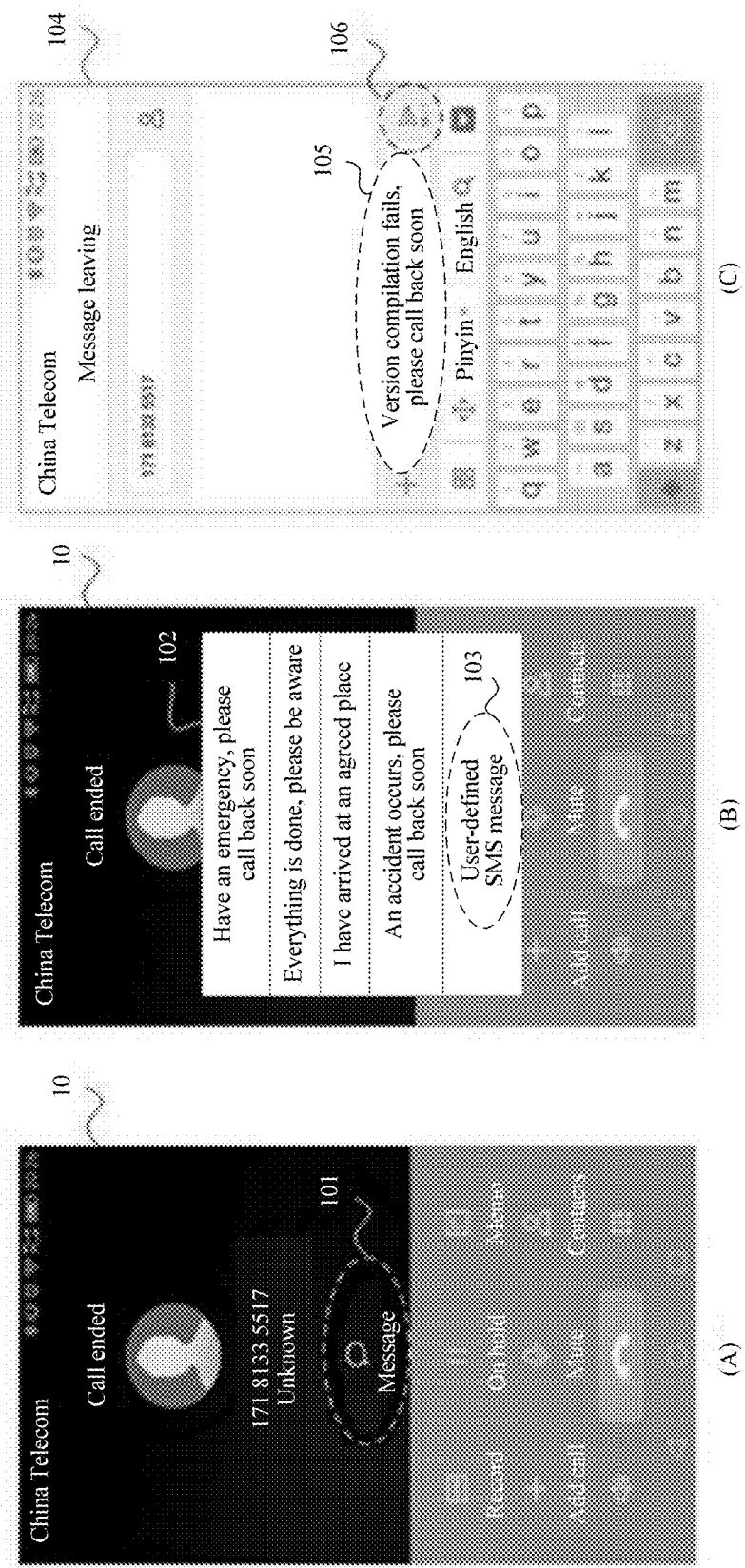
FIG. 2B is a schematic diagram in which a calling party edits a call reason according to an embodiment of the present invention.

As shown in FIG. 2B, if the called party does not answer the call of the calling party, a first SMS control 101 may be displayed in the outgoing call interface 10 of the calling party. The first SMS control 101 is configured to receive an operation that is entered by a user of the calling party and that is used to display a first SMS interface. Herein, the operation may be referred to as first input. The first SMS interface may be configured to receive a short message text that is entered by the user of the calling party and that indicates a call reason. In this embodiment of the present invention, the call reason may be a call intention or a call purpose of the calling party, or an event that needs to be notified by the calling party to the called party, or the like.

When the first input is detected, the first SMS interface may be opened, so that the user of the calling party may enter the short message text that indicates the call reason.

There may be a plurality of presentation forms of the first SMS interface, and this embodiment of the present invention imposes no limitation. The following describes two presentation forms:

In an implementation, the first SMS interface may be directly a first SMS edit interface 104 shown in FIG. 2B. The user of the calling party may directly open the first SMS edit interface 104 by clicking the first SMS control 101. Then, the user of the calling party may enter, in the first SMS edit interface 104, a short message text 105 that indicates a call reason.

In another implementation, the first SMS interface may include a multilevel interface. For example, as shown in FIG. 2B, the first SMS interface includes a first selection menu 102 and a first SMS edit interface 104. The user first clicks the first SMS control 101 to open the first selection menu 102, and then selects an option in the first selection menu 102 to open the first SMS edit interface 104. Specifically, a manner of entering, in the first SMS interface shown in FIG. 2B, the short message text that indicates the call reason may include: First, the user of the calling party may select a "user-defined short message" option in the first selection menu 102, and enter, in an SMS edit box, a user-defined short message text 105 that indicates a call reason, for example, "version compilation fails, please call back soon". Second, the user of the calling party may select, in the first selection menu 102, a short message text that is preset in a system, for example, "have an emergency, please call back soon", and the preset short message text selected by the user is automatically entered in an SMS edit box.

As shown in FIG. 2B, when a user operation used to send the short message text 105 is detected by using a sending button 106, the calling party may encapsulate the short message text 105 into a short message, and send the short message to the called party. Herein, the short message may be referred to as a first short message, so as to distinguish between the first short message and a second short message mentioned in a subsequent embodiment. It should be understood that the first short message corresponds to the foregoing missed call. The calling party may express, by using the first short message, the call reason corresponding to the foregoing missed call.

In specific implementation, the user operation used to send the short message text 105 may be a light touch operation, a pressing operation, a sliding operation, or the like performed on the sending button 106. In some embodiments, the user operation used to send the short message text 105 may also be of another form. For example, the short message text 105 is triggered to be sent by using a voice control function (for example, "Siri"). In this embodiment of the present invention, the user operation may be referred to as second input.

In some embodiments, the calling party may also open the first SMS interface by using an SMS portal corresponding to an outgoing call record in a call record, so as to edit a short message that indicates a call reason. For details, refer to an SMS portal 601 in FIG. 6B.

In this embodiment of the present invention, the short message text of the first short message may include a text form such as a word, a voice, or a picture.

In some embodiments, the short message text of the first short message may include a keyword, and the keyword is used to receive a user operation to open an application corresponding to the keyword. For example, a keyword indicating a place name may be used to receive a user click operation to open a map application and display positioning of the place name. For another example, a keyword indicating a time may be used to receive a user click operation to open a calendar. For still another example, a keyword indicating a phone number may be used to receive a user click operation to open a phone dial pad (the phone number is automatically set in the dial pad). The examples are merely some implementations of this embodiment of the present invention, which may be different in actual application. This shall not be construed as a limitation.

Figure 3A:
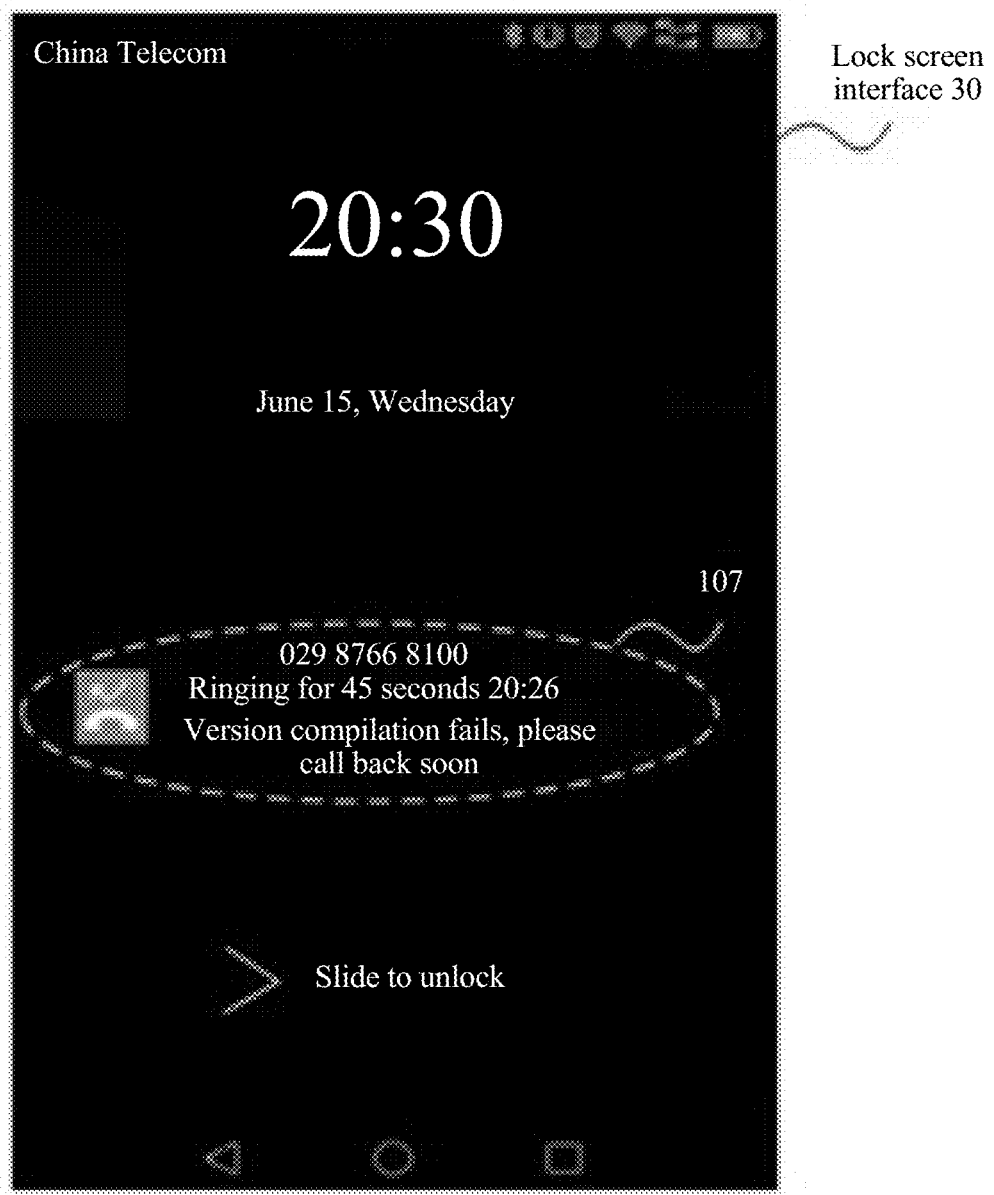
FIG. 3A to FIG. 3C are schematic diagrams in which a called party displays, through association, an incoming call and a call reason corresponding to the incoming call according to an embodiment of the present invention.
Figure 3B:
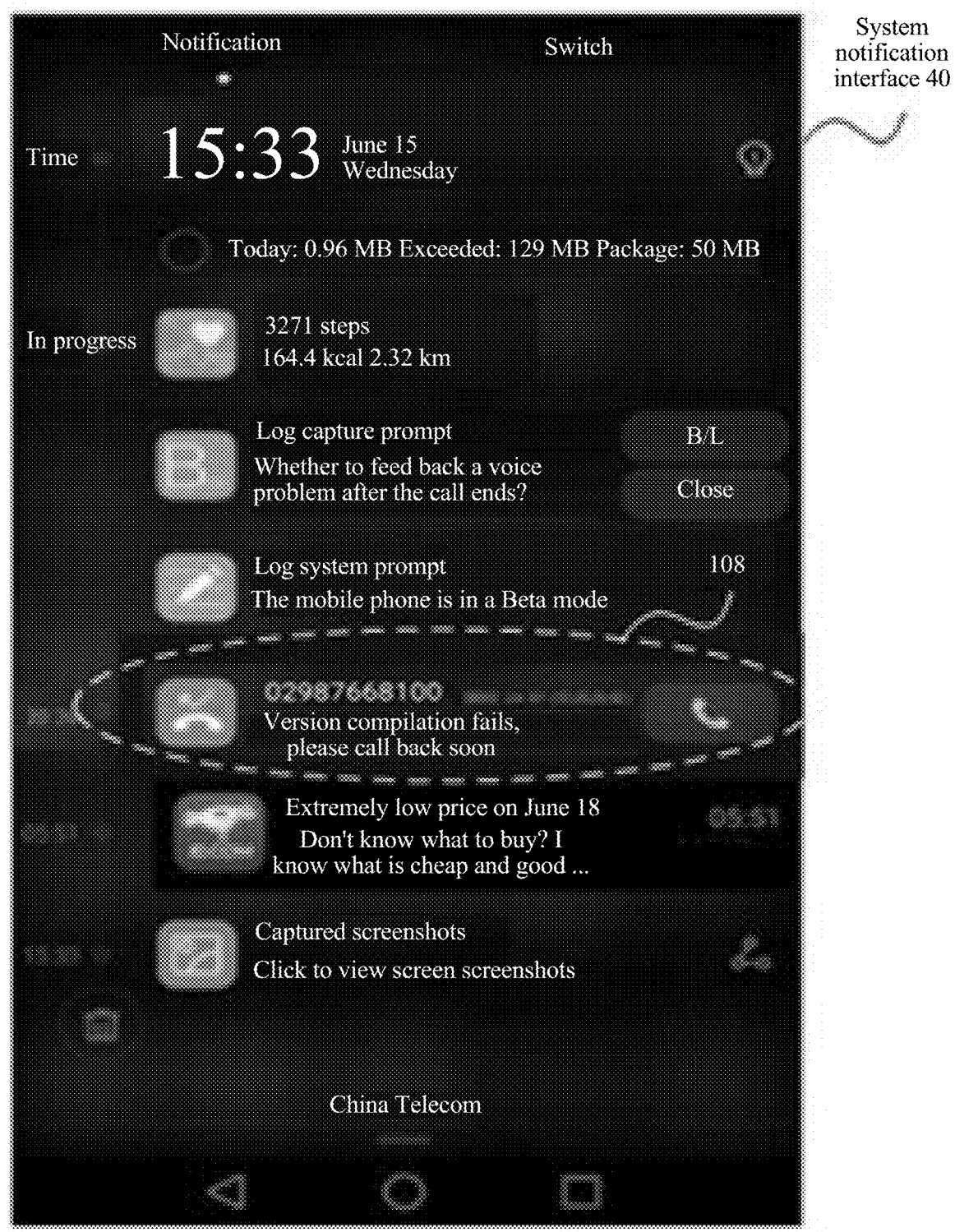
Figure 3C:
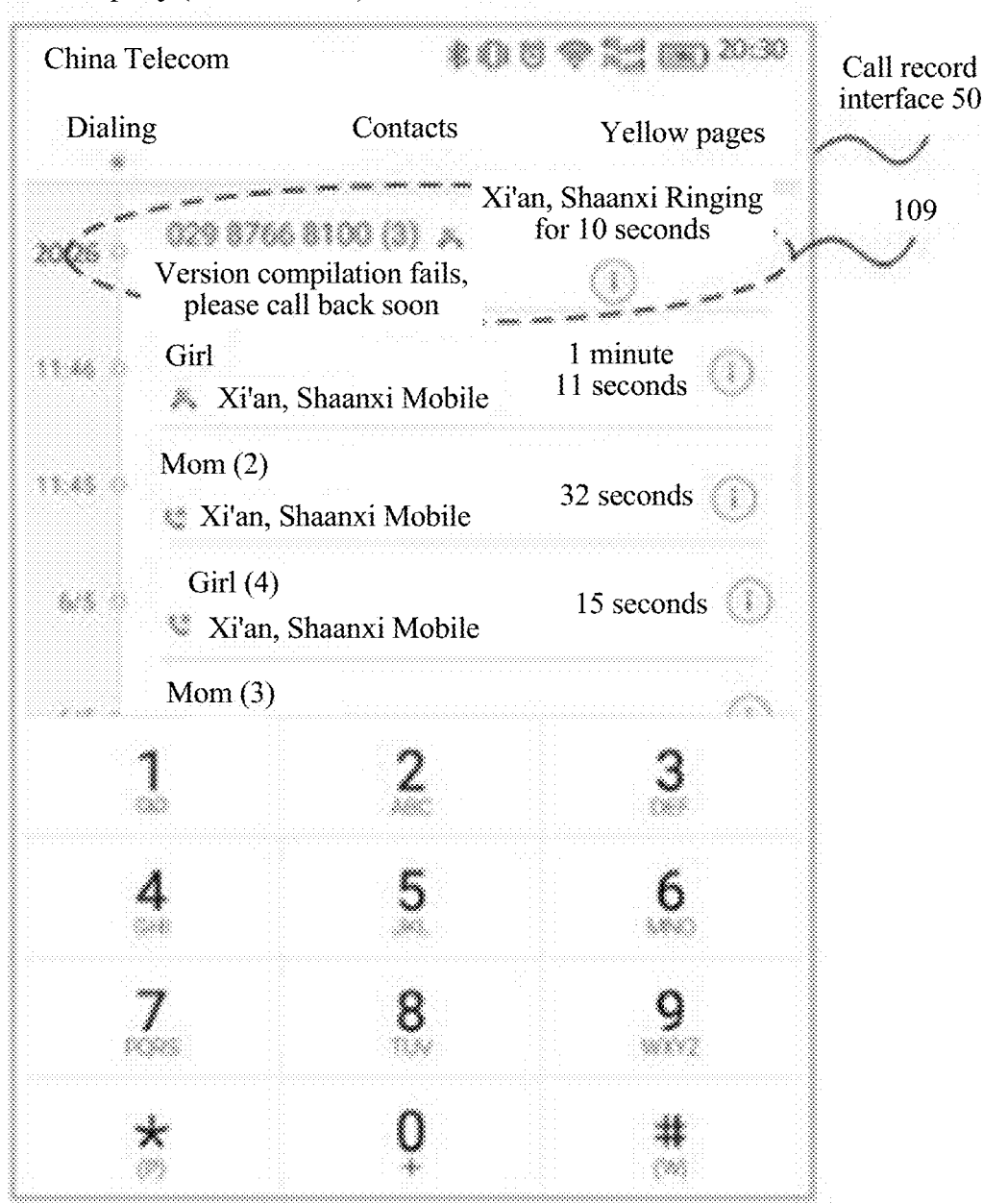

FIG. 3A to FIG. 3C are schematic diagrams of how to display the first short message after the first short message is received on the side of the called party.

As shown in FIG. 3A, the short message text of the received first short message and the missed call corresponding to the first short message may be displayed in a lock screen interface 30 of the called party through association. Specifically, for the missed call, incoming call information of the missed call may be displayed in the lock screen interface 30 of the called party, for example, an incoming call time, an incoming call number, call duration, and a telecommunications home location of the incoming call number. For the short message text of the first short message, a part of words in the short message text may be displayed in the lock screen interface 30, for example, first 20 characters. In some embodiments, all of the short message text may be displayed in the lock screen interface 30.

In specific implementation, to represent an association between the short message text of the first short message and the missed call, the two may be displayed on a same display control in the lock screen interface 30.

For example, as shown in FIG. 3A, the same display control may be a button (Button) 107, an icon (Icon) corresponding to the button 107 may be a picture indicating the missed call, and a text (Text) corresponding to the button may be the incoming call information of the missed call and a part or all of the short message text of the first short message. A listener (Listener) may be configured for the button 107. The listener is a listening program, and is configured to monitor a user click (Click) operation performed on the button 107. Once the user click operation is captured, a dial interface is opened, and the incoming call number (that is, the phone number of the calling party) is automatically set in a dial pad, so that the called party calls back. The example is merely an implementation provided in this embodiment of the present invention, which may be different in actual application. This shall not be construed as a limitation. FIG. 3A is merely an implementation of this embodiment of the present invention. For UI expression of displaying the incoming call information and the short message text in the lock screen interface through association, for example, a UI arrangement manner, no limitation is imposed herein.

It can be understood that the short message text of the first short message and the missed call corresponding to the first short message are displayed in the lock screen interface 30 through association, so that the user of the called party can learn of, at a first time of performing a re-operation (for example, performing screen wakeup) on a called party terminal, the call reason corresponding to the missed call, and therefore the called party calls back in time.

As shown in FIG. 3B, the short message text of the received first short message and the missed call corresponding to the first short message may be displayed in a system notification interface 40 of the called party through association.

In specific implementation, as shown in FIG. 3B, to represent an association between the short message text and the missed call, the two may be displayed on a same display control in the system notification interface 40.

For example, the same display control may be an item (Item) 108 in the system notification interface 40. The system notification interface 40 may be a drop-down list (List). The list may include a plurality of items, and each item is used to display a notification, such as the missed call or an advertisement push. Specifically, the called party may display incoming call information of the missed call and a part or all of the short message text in the item 108. For the incoming call information, refer to description in FIG. 3A. Specifically, an icon corresponding to the item 108 may be a picture indicating the missed call, and a text corresponding to the item 108 may be the incoming call information of the missed call and a part or all of the short message text of the first short message. FIG. 3B is merely an implementation of this embodiment of the present invention. For UI expression of displaying the incoming call information and the short message text in the system notification interface through association, for example, a UI arrangement manner, no limitation is imposed herein.

As shown in FIG. 3B, a dial button may be further configured on the item 108. A listener may be configured for the dial button. Once the listener captures a user click operation performed on the item 108, a dial interface is opened, and an incoming call number (that is, the phone number of the calling party) is automatically set in a dial pad, so that the called party calls back. The example is merely an implementation provided in this embodiment of the present invention, which may be different in actual application. This shall not be construed as a limitation.

It can be understood that the short message text of the first short message and the missed call corresponding to the first short message are displayed in the system notification interface 40 through association, so that the user of the called party can learn of, when viewing a system notification message, the call reason corresponding to the missed call, and therefore the called party calls back in time.

As shown in FIG. 3C, the short message text of the received first short message and the missed call corresponding to the first short message may be displayed in a call record interface 50 of the called party through association.

In specific implementation, as shown in FIG. 3C, to represent an association between the short message text and the missed call, the two may be displayed on a same display control in the call record interface 50.

For example, the same display control may be an item 109 in the call record interface 50. The call record interface 50 may be a list. The list may include a plurality of items, and each item is used to display a call record. A called party terminal may display incoming call information of the missed call and a part or all of the short message text in the item 109. For the incoming call information, refer to description in FIG. 3A. FIG. 3C is merely an implementation of this embodiment of the present invention. For UI expression of displaying the incoming call information and the short message text in the call record interface through association, for example, a UI arrangement manner, no limitation is imposed herein.

In specific implementation, a listener may be configured for each item in the call record interface 50. Once the listener captures a user click operation performed on the item, a dial interface is opened, and a phone number in the item is automatically set in a dial pad. For the item 109, an incoming call number (that is, the phone number of the calling party) may be automatically set in the dial pad, so that the called party calls back. The example is merely an implementation provided in this embodiment of the present invention, which may be different in actual application. This shall not be construed as a limitation.

It can be understood that the short message text of the first short message and the missed call corresponding to the first short message are displayed in the call record interface 50 through association, so that the called party can intuitively learn of, by consulting a call record, the call reason corresponding to the missed call, and therefore the called party calls back in time.

In some embodiments, that the called party does not answer the call may further include the following case: When duration in which the calling party calls the called party exceeds a second time value, for example, 5 seconds, the called party still does not answer the call. Compared with the first time value, the second time value is smaller. If the duration in which the calling party calls the called party exceeds the first time value, the call immediately ends. If the duration in which the calling party calls the called party exceeds the second time value but does not reach the first time, the call continues.

Figure 4:
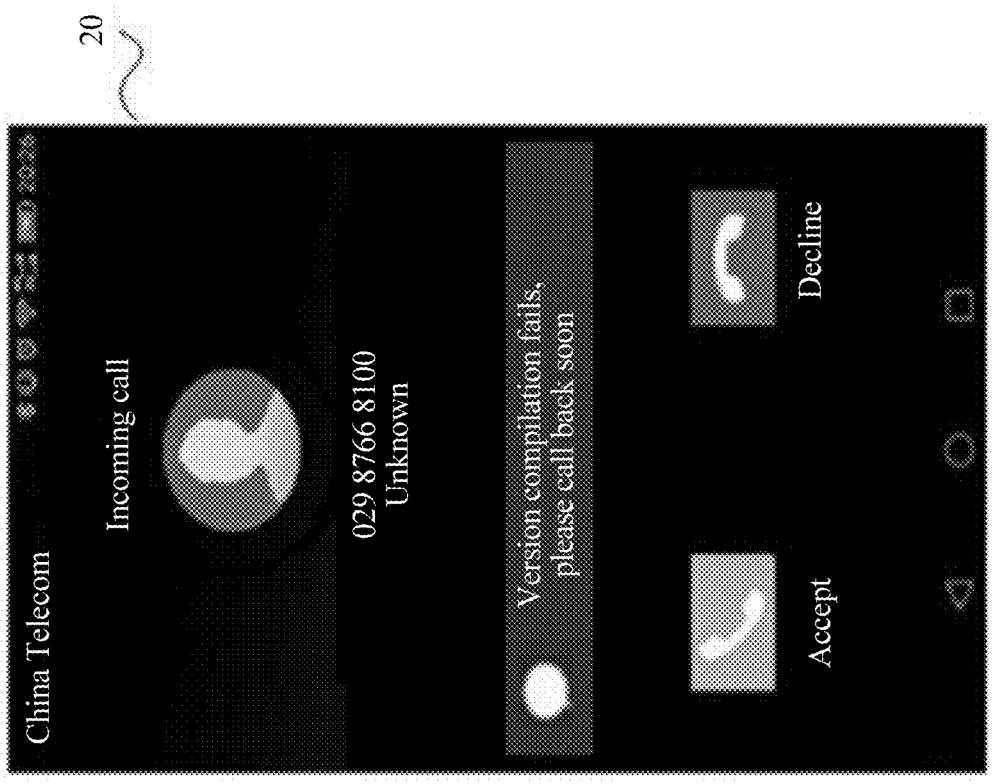
FIG. 4 is a schematic diagram in which a calling party sends a call reason during calling according to an embodiment of the present invention.
Figure 4:
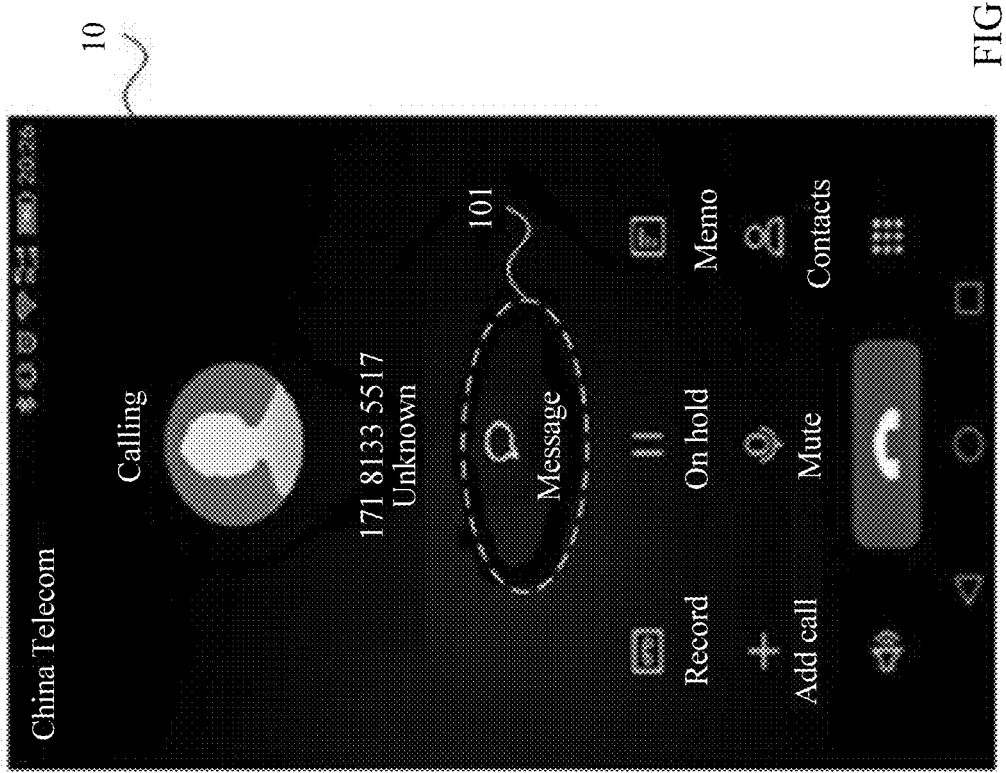

As shown in FIG. 4, when the duration in which the calling party calls the called party exceeds the second time value, and the called party still does not answer the call, the first SMS control 101 may be displayed in the outgoing call interface 10 of the calling party. Therefore, the calling party may open the first SMS interface by using the first SMS control 101 in a call process; enter, in the first SMS interface, the short message text that indicates the call reason; and finally send the first short message.

Correspondingly, as shown in FIG. 4, the called party receives the first short message. In this case, the call from the calling party does not end. The short message text of the first short message is displayed in the incoming call interface 20 of the called party, namely, the call reason of the calling party ("version compilation fails, please call back soon"). It can be understood that, because the first short message is sent in a process in which the calling party calls the called party, the called party may learn of the call reason of the calling party when receiving the incoming call of the calling party, so that the called party immediately answers the call.

It should be noted that, in this case, the second time value may be set by default, or may be set by the calling party in a user-defined manner, or may be intelligently set based on a user habit of the calling party. Specially, the preset time value may be 0. In other words, it indicates that the first SMS control 101 may be displayed in the outgoing call interface 10 of the calling party at an initial moment of calling the called party. Therefore, the calling party may send the first short message when initiating the call to the called party, so that the called party learns of the call reason of the calling party as early as possible, thereby improving a possibility that the called party answers the call in time.

Figure 1:
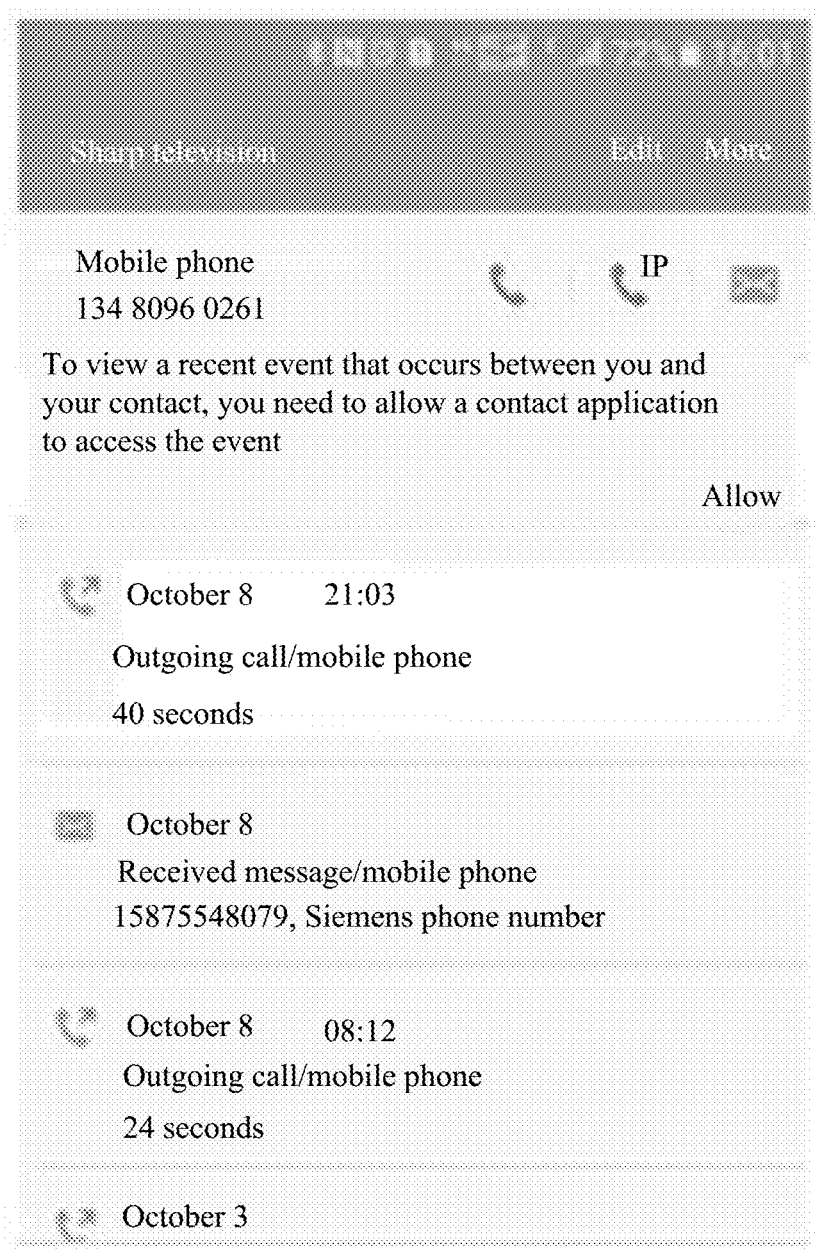
FIG. 1 is a schematic diagram of an existing manner of viewing a recent contact event of a contact.

It can be learned from FIG. 2A, FIG. 2B, FIG. 3A to FIG. 3C, and FIG. 4 that, in this embodiment of the present invention, the first short message is not an ordinary short message, and carries a preset flag bit. Therefore, the called party may differently process an ordinary short message and the first short message. When receiving the first short message, the called party may determine an incoming call record associated with the first short message, and display the incoming call record and the short message text of the first short message through association. However, in the prior art shown in FIG. 1, all recent contact events (including short messages and call records) that occur between the called party and a same contact are merely displayed in a same interface. In this manner, an association between a short message and a call record cannot be intuitively and accurately notified to the user. In addition, there may be no direct association between the short message and the call record. For example, in the interface shown in FIG. 1, the user cannot intuitively learn of an association between a short message received on "October 8" and two call records on "October 8".

It should be understood that, by using the call processing function provided in this embodiment of the present invention, the incoming call and the call reason corresponding to the incoming call can be displayed on the side of the called party through association, so that the called party clearly learns of the call reason of the calling party.

FIG. 5A, FIG. 5B, FIG. 6A, and FIG. 6B are schematic diagrams of a call processing function for the second call scenario according to an embodiment of the present invention. The following provides detailed description.

Figure 5A:
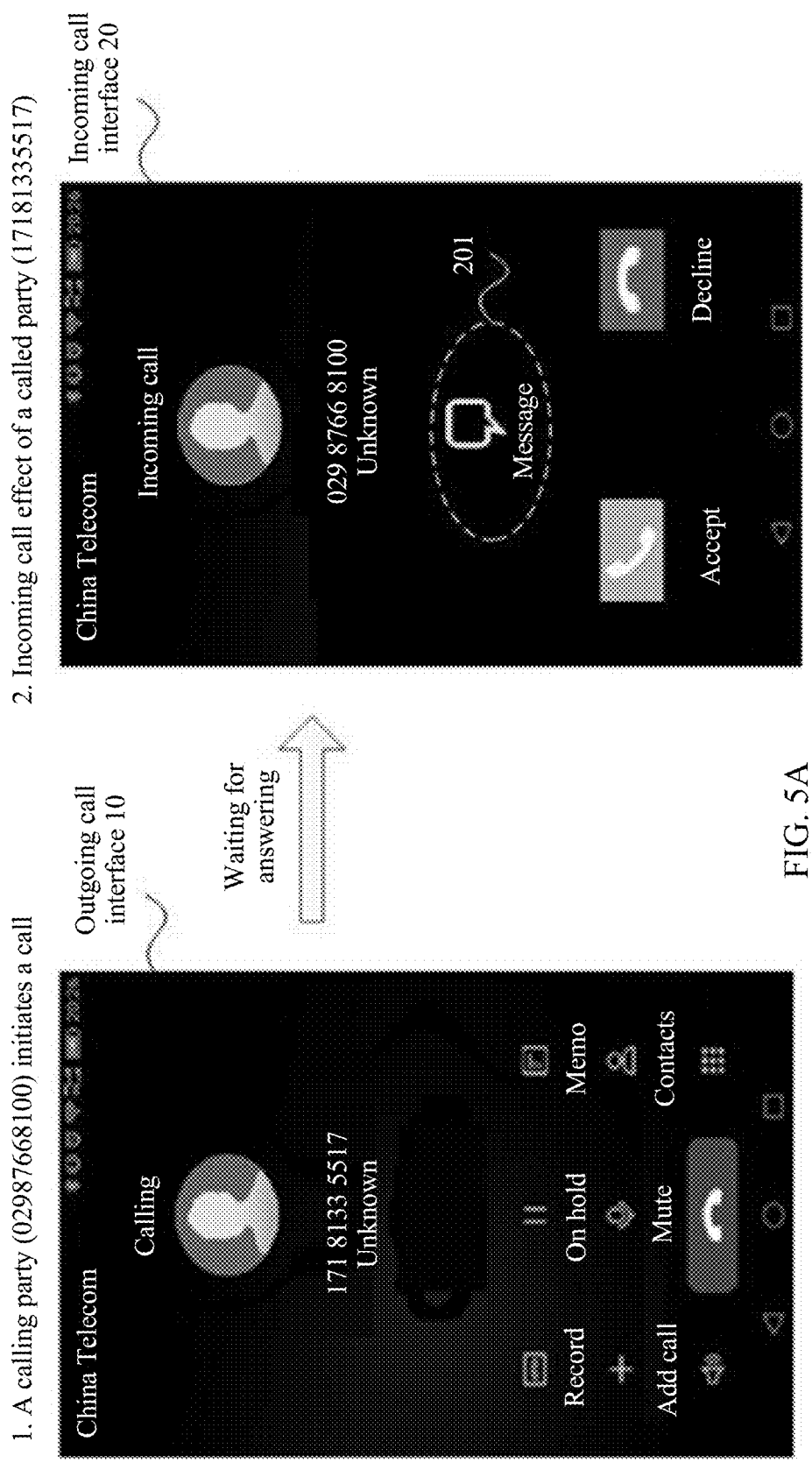
FIG. 5A is a schematic diagram of another call scenario according to an embodiment of the present invention.

FIG. 5A is a schematic diagram in which a calling party (phone number: 02987668100) calls a called party (phone number: 17181335517). An outgoing call interface 10 is displayed on a side of the calling party, and an incoming call interface 20 is displayed on a side of the called party.

As shown in FIG. 5A, a second SMS control 201 may be displayed in the incoming call interface 20 of the called party. The second SMS control 201 may be configured to receive an operation that is entered by a user of the called party and that is used to open a second SMS interface. Herein, the operation may be referred to as third input. The third input may be specifically a light touch operation, a pressing operation, a sliding operation, or the like performed on the second SMS control 201. For a user operation form corresponding to the third input, this embodiment of the present invention imposes no limitation. The second SMS interface may be configured to receive a reason that is for rejecting the incoming call and that is entered by the user of the called party.

In specific implementation, the third input may be further used to trigger to disconnect the incoming call. In other words, by clicking the second SMS control 201, the user of the called party may not only open the second SMS interface, but also disconnect the incoming call. In this embodiment of the present invention, the third input may also be referred to as an SMS rejection operation. Correspondingly, on the side of the calling party, the incoming call disconnected by the called party may be referred to as a rejected outgoing call.

When the third input is detected, the second SMS interface may be opened, so that the user of the called party may enter a short message text that indicates the call rejection reason for rejecting the incoming call.

In specific implementation, there may be a plurality of presentation forms of the second SMS interface, and this embodiment of the present invention imposes no limitation. The following describes two presentation forms:

In an implementation, the second SMS interface may be directly a second SMS edit interface 204. The user of the called party may directly open the second SMS edit interface 204 by clicking the second SMS control 201. Then, the user of the called party may enter, in the second SMS edit interface 204, the short message text that indicates the call rejection reason.

Figure 5B:
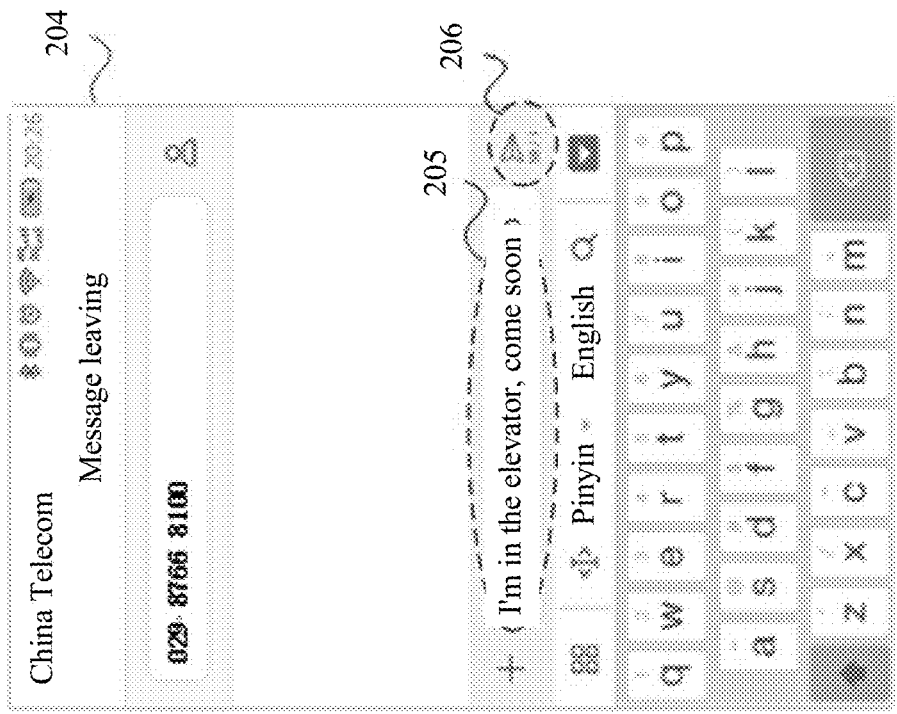
FIG. 5B is a schematic diagram in which a called party edits a call rejection reason according to an embodiment of the present invention.
Figure 5B:
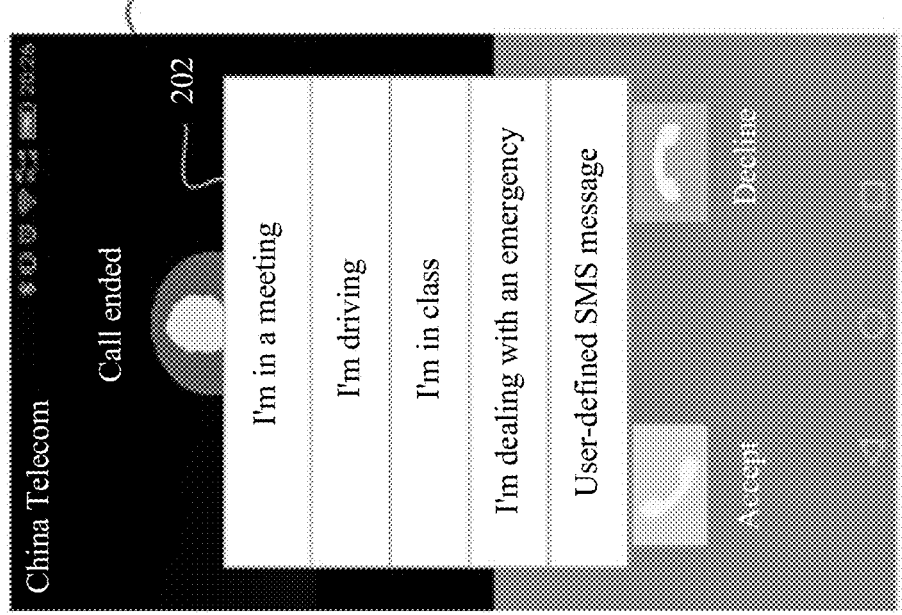

In another implementation, the second SMS interface may include a multilevel interface. For example, as shown in FIG. 5B, the second SMS interface includes a second selection menu 202 and a second SMS edit interface 204. The user of the called party first clicks the SMS control 201 to open the second selection menu 202, and then selects an option in the second selection menu 202 to open the second SMS edit interface 204. Specifically, a manner in which the user of the called party enters, in the second SMS interface shown in FIG. 5B, the short message text that indicates the reason for rejecting the incoming call may include: First, the user of the called party selects a "user-defined short message" option in the second selection menu 202, and enters, in an SMS edit box, a user-defined short message text 205 that indicates a reason for rejecting the incoming call, for example, "I am in the elevator, come soon". Second, the user of the called party selects, in the second selection menu 202, a short message text that is preset by the called party terminal, for example, "I am in a meeting", and the preset short message text selected by the user of the called party is automatically entered in an SMS edit box.

As shown in FIG. 5B, when a user operation used to send the short message text 205 is detected by using a sending button 206, the called party may encapsulate the short message text 205 into a short message. Herein, the short message may be referred to as a second short message, so as to distinguish between the second short message and the first short message mentioned in the foregoing embodiment. It should be understood that the second short message corresponds to the foregoing rejected outgoing call. The called party may express, by using the second short message, the call rejection reason corresponding to the rejected outgoing call.

In specific implementation, the user operation used to send the short message text 205 may be a light touch operation, a pressing operation, a sliding operation, or the like performed on the sending button 206. In some embodiments, the user operation used to send the short message text 205 may also be of another form. For example, the call rejection reason may be triggered to be sent by using a voice control function (for example, "Ski"). In this embodiment of the present invention, the user operation may be referred to as fourth input.

In this embodiment of the present invention, the short message text of the second short message may include a text form such as a word, a voice, or a picture.

In some embodiments, the short message text of the second short message may include a keyword, and the keyword is used to receive a user operation to open an application corresponding to the keyword. For example, a keyword indicating a place name may be used to receive a user click operation to open a map application and display positioning of the place name. For another example, a keyword indicating a time may be used to receive a user click operation to open a calendar. For still another example, a keyword indicating a phone number may be used to receive a user click operation to open a phone dial pad (the phone number is automatically set in the dial pad). The examples are merely some implementations of this embodiment of the present invention, which may be different in actual application. This shall not be construed as a limitation.

Figure 6A:
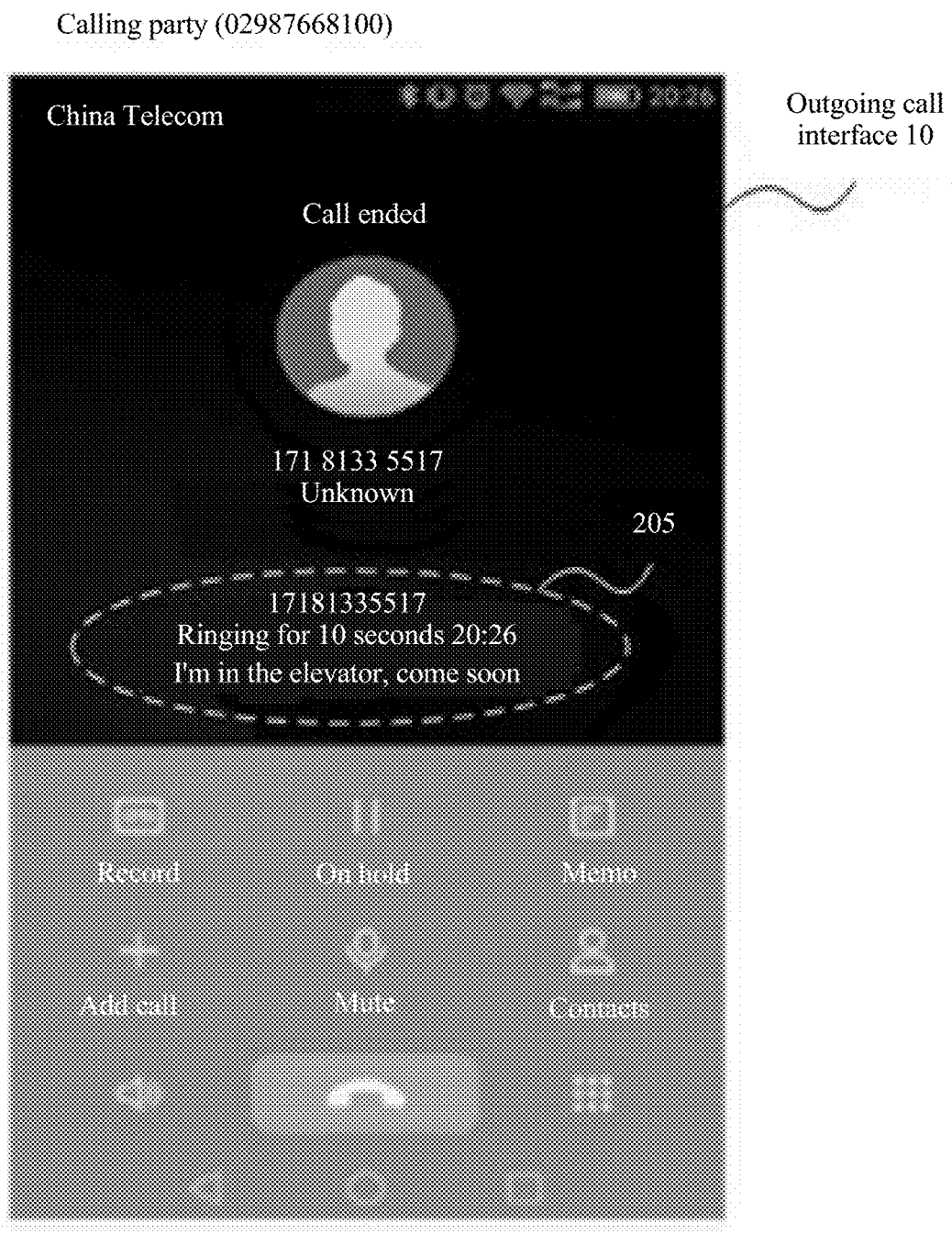
FIG. 6A and FIG. 6B are schematic diagrams in which a calling party displays, through association, a rejected outgoing call and a call rejection reason corresponding to the rejected outgoing call according to an embodiment of the present invention.
Figure 6B:
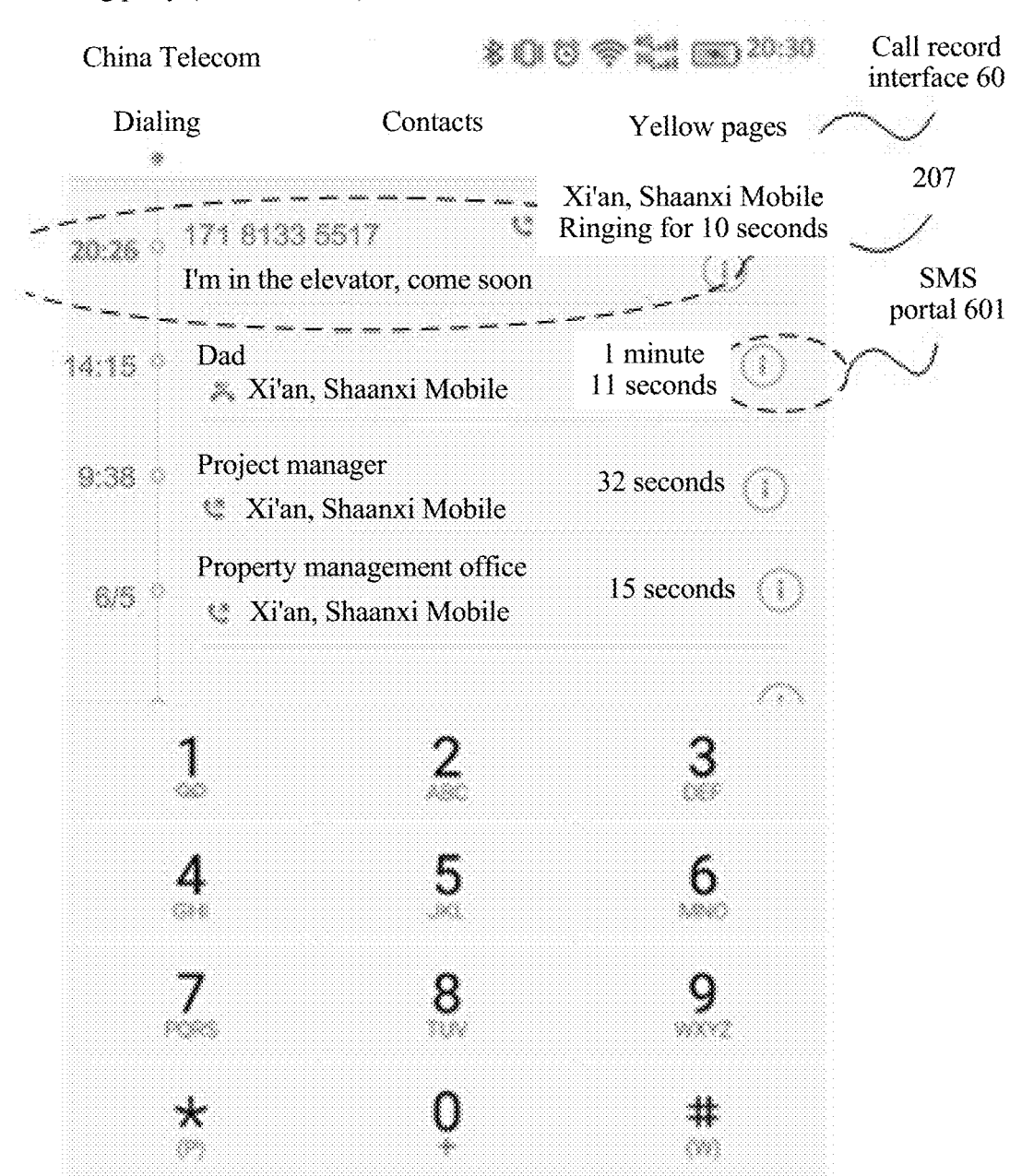

FIG. 6A and FIG. 6B are schematic diagrams of how to display the second short message after the second short message is received on the side of the calling party.

As shown in FIG. 6A, the short message text 205 of the second short message may be displayed in the outgoing call interface 10 of the calling party. For the short message text 205 of the second short message, a part of words in the short message text 205 may be displayed in the outgoing call interface 10, for example, first 20 characters. In some embodiments, all of the short message text 205 may be displayed in the outgoing call interface 10.

In specific implementation, when it is detected that the outgoing call is rejected by the called party, the outgoing call interface 10 of the calling party may disappear after keeping displaying for a period of time (for example, 3 seconds), so that a user of the calling party may clearly view the short message text of the second short message in the outgoing call interface 10 after the outgoing call is rejected, and learn of the call rejection reason of the called party.

It can be understood that the short message text 205 of the second short message is displayed in the outgoing call interface 10, so that the user of the calling party can intuitively learn of the reason why the called party rejects the outgoing call.

As shown in FIG. 6B, the short message text of the second short message and the outgoing call corresponding to the second short message may be displayed in a call record interface 60 of the calling party through association. Herein, the outgoing call corresponding to the second short message is the rejected outgoing call.

In specific implementation, to represent an association between the short message text of the second short message and the outgoing call rejected by the called party, the short message text of the second short message and outgoing call information of the rejected outgoing call may be displayed on a same display control of the call record interface 70. Herein, the outgoing call information may include a dial time, a call number, call duration, a telecommunications home location of the call number, and the like of the outgoing call.

For example, the short message text of the second short message and the outgoing call information of the rejected outgoing call may be displayed on an item 207 in the call record interface 60. The call record interface 60 may be a list. The list may include a plurality of items, and each item is used to display a call record. FIG. 6B is merely an implementation of this embodiment of the present invention. For UI expression of displaying the outgoing call information and the short message text of the second short message in the call record interface through association, for example, a UI arrangement manner, no limitation is imposed herein.

In specific implementation, a listener may be configured for each item in the call record interface 60. Once the listener captures a user click operation performed on the item, a dial interface is opened, and a phone number in the item is automatically set in a dial pad. For the item 207, a call number (that is, the phone number of the called party) may be automatically set in the dial pad, so that the calling party calls the called party again. The example is merely an implementation provided in this embodiment of the present invention, which may be different in actual application. This shall not be construed as a limitation.

It can be understood that the rejected outgoing call and the short message text of the second short message are displayed in the call record interface 60 through association, so that the calling party can intuitively learn of, by consulting a call record, the call rejection reason corresponding to the rejected outgoing call, and therefore the calling party can better communicate with the called party.

It can be learned from FIG. 5A, FIG. 5B, FIG. 6A, and FIG. 6B that, in this embodiment of the present invention, the second short message is not an ordinary short message, and carries a preset flag bit. Therefore, the calling party may differently process an ordinary short message and the second short message. When receiving the second short message, the calling party may determine an outgoing call record associated with the second short message, and display the outgoing call record and the short message text of the second short message through association. However, in the prior art shown in FIG. 1, all recent contact events (including short messages and call records) that occur between the called party and a same contact are merely displayed in a same interface. In this manner, an association between a short message and a call record cannot be intuitively and accurately notified to the user. In addition, there may be no direct association between the short message and the call record. For example, in the interface shown in FIG. 1, the user cannot intuitively learn of an association between a short message received on "October 8" and two call records on "October 8".

It should be understood that, by using the call processing function provided in this embodiment of the present invention, the rejected outgoing call and the call rejection reason corresponding to the rejected outgoing call can be displayed on the side of the calling party through association, so that the calling party clearly learns of the call rejection reason of the called party.

For the first call scenario, as shown in FIG. 7, the short message text 105 of the first short message may also be displayed in a call record interface 60 of the calling party. In other words, the calling party may record and display the call reason why the calling party calls the called party. In specific implementation, to indicate that the short message text 105 is sent by the calling party, an identifier that indicates "send" and that corresponds to the short message text 105 may be further displayed. For example, a label (Label) 601 corresponding to the short message text 105 is displayed, a text corresponding to the label 601 is "send", and a picture corresponding to the label 601 is a picture indicating "send".

It can be understood that recording and displaying the first short message on the side of the calling party can help the calling party manage outgoing call records, so that the calling party reviews call reasons corresponding to all outgoing calls, especially an outgoing call in which a contact name of the called party is not stored (only a phone number is displayed in a call record), and a call reason corresponding to the outgoing call can help the calling party learn of more information about the called party and the outgoing call.

Figure 8:
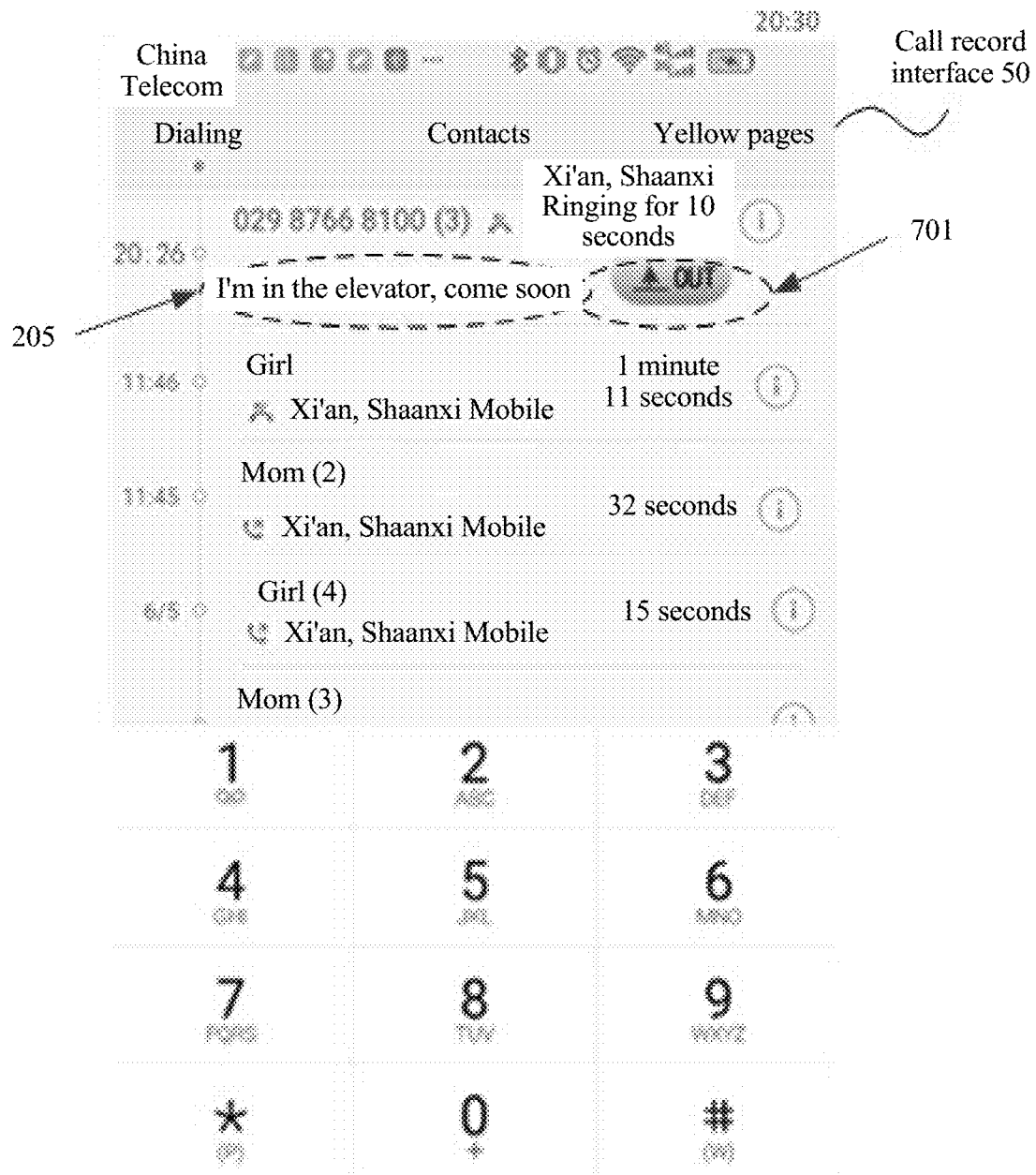
FIG. 8 is a schematic diagram in which a called party displays, through association in a call record, a missed call and a call rejection reason corresponding to the missed call according to an embodiment of the present invention.

For the second call scenario, as shown in FIG. 8, the short message text 205 of the second short message may also be displayed in a call record interface 50 of the called party. In other words, the called party may also record and display the call rejection reason why the called party rejects the incoming call. In specific implementation, to indicate that the short message text 205 is sent by the called party, an identifier that indicates "send" and that corresponds to the short message text 205 may be further displayed. For example, a label 701 corresponding to the short message text 205 is displayed, a text corresponding to the label 701 is "send", and an icon corresponding to the label 701 is a picture indicating "send".

It can be understood that recording and displaying the call rejection reason on the side of the called party can help the called party manage missed call records, so that the calling party reviews call rejection reasons corresponding to all missed calls, especially a missed call in which a contact name of the calling party is not stored (only a phone number is displayed in a call record), and a call rejection reason corresponding to the missed call can help the called party learn of more information about the called party and the outgoing call.

In some embodiments, for a same call, the first call scenario and the second call scenario may coexist. The following two call scenarios further occur.

Figure 9:
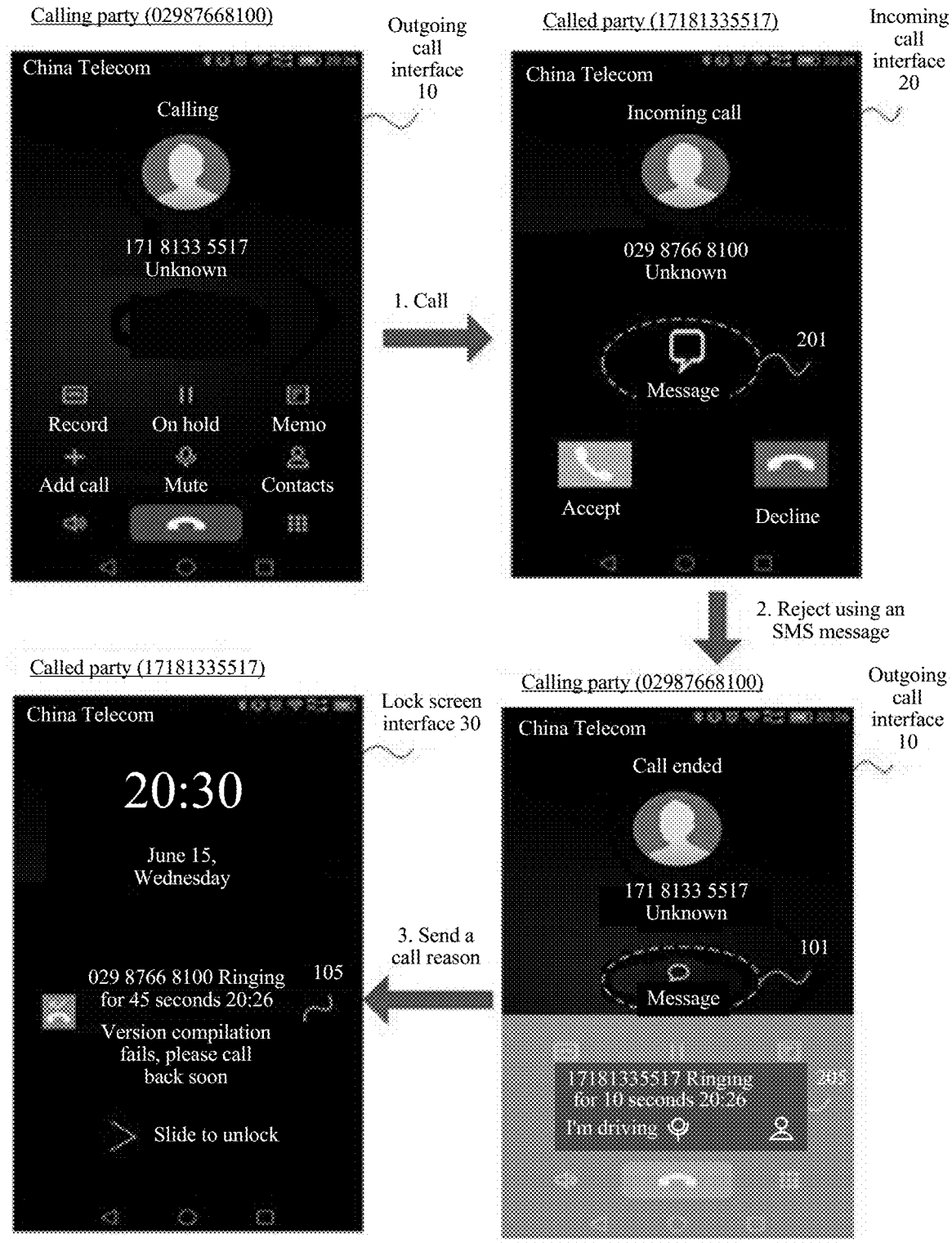
FIG. 9 is a schematic diagram in which a calling party edits a call reason after a called party rejects a call by using a short message according to an embodiment of the present invention.

(1) As shown in FIG. 9, and as shown in step 1, the calling party calls the called party. As shown in step 2, the called party rejects the incoming call from the calling party, and sends, to the calling party, the second short message that indicates the call rejection reason, so as to notify the calling party of a reason for inconvenience of answering the call. Correspondingly, as shown in step 3, for the outgoing call rejected by the called party, the short message text 205 that indicates the call rejection reason is displayed in the outgoing call interface, and the calling party sends, to the called party, the first short message that indicates the incoming call reason, so as to remind the called party to call back as early as possible.

Figure 10:
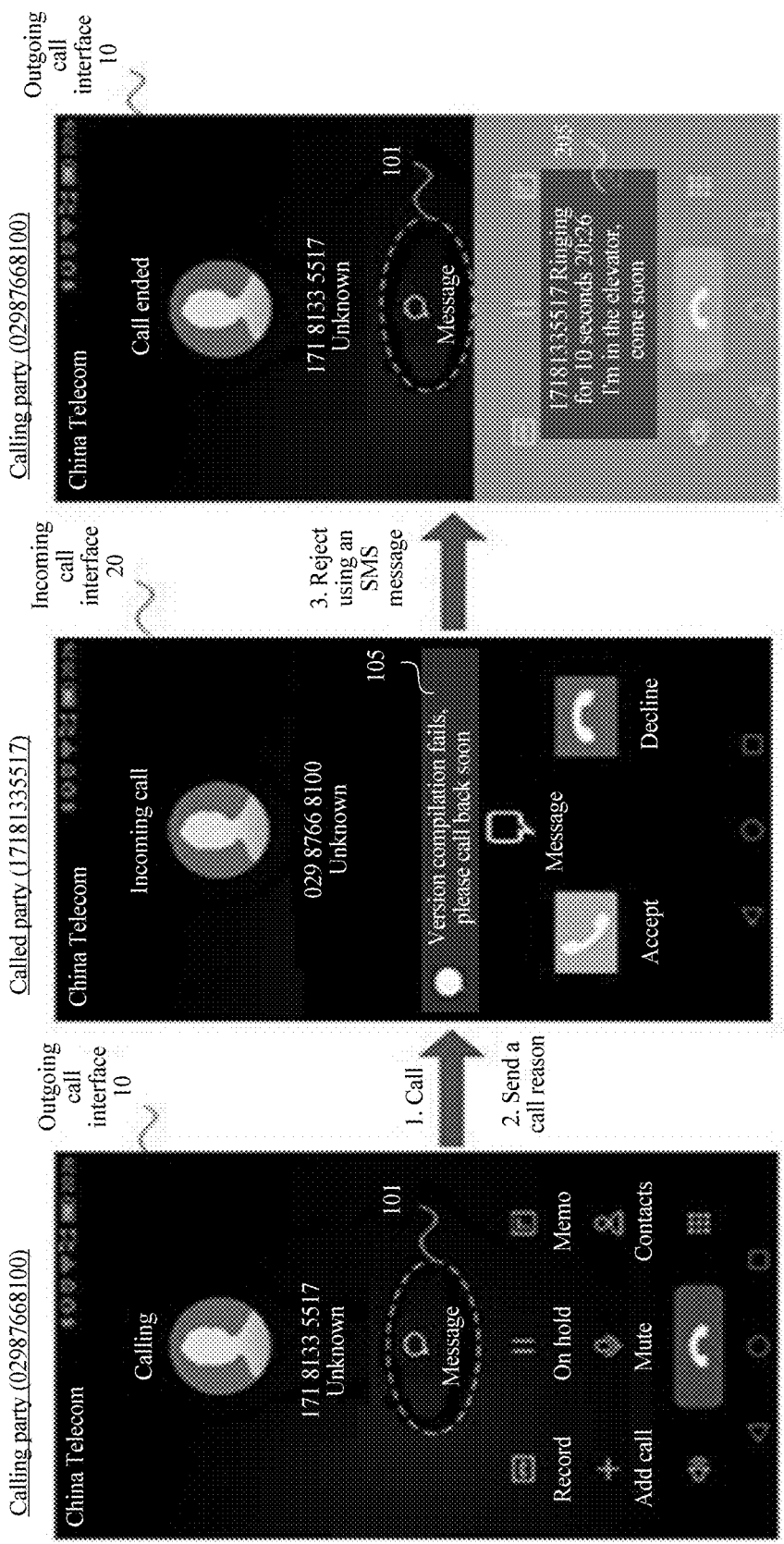
FIG. 10 is a schematic diagram in which after a calling party prompts a call reason by using a short message in a call process, a called party rejects a call by using a short message according to an embodiment of the present invention.

(2) As shown in FIG. 10, and as shown in step 1, the calling party calls the called party. In addition, as shown in step 2, the calling party edits and sends, to the called party in a call process, the first short message that indicates the call reason, so as to remind the called party to immediately answer the call. As shown in step 3, for the incoming call from the calling party, the short message text 105 that indicates the call reason is displayed in the incoming call interface, but the called party still rejects the incoming call because of inconvenience, and edits and sends, to the calling party, the second short message that indicates the call rejection reason, so as to notify the calling party of inconvenience of answering the call.

It should be understood that in the two call scenarios described in the foregoing (1) and (2), the outgoing call is rejected for the calling party, and the incoming call is not answered for the called party.

In specific implementation, for the two call scenarios described in the foregoing (1) and (2), refer to the embodiment of displaying the short message text 105 of the first short message on the side of the called party in FIG. 3A to FIG. 3C, namely, the call reason of the calling party. For the two call scenarios described in the foregoing (1) and (2), refer to the embodiment of displaying the short message text 205 of the second short message on the side of the calling party in FIG. 6A and FIG. 6B, namely, the call rejection reason of the called party.

In some embodiments, for the two call scenarios described in the foregoing (1) and (2), both the call reason (the short message text of the first short message) of the calling party and the call rejection reason (the short message text of the second short message) of the called party may be displayed in a call record on the side of the called party.

Figure 11:
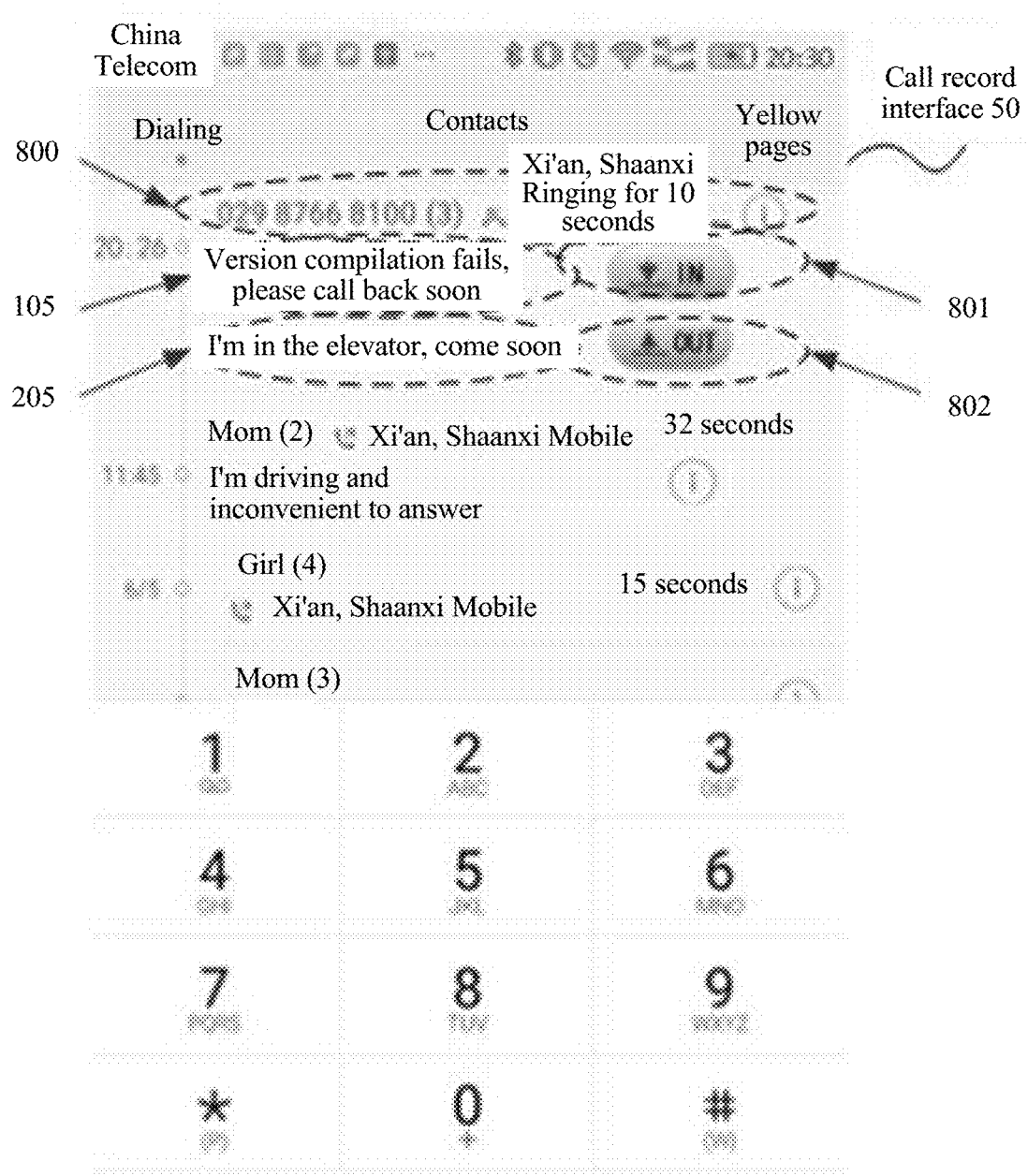
FIG. 11 is a schematic diagram in which a called party displays a missed call, a call rejection reason corresponding to the missed call, and a call reason through association in a call record according to an embodiment of the present invention.

For example, as shown in FIG. 11, both the short message text 105 of the first short message and the short message text 205 of the second short message correspond to a missed call record 800. In the call record 50 on the side of the called party, the short message text 105 and the short message text 205 may be displayed in the corresponding missed call 800. As shown in FIG. 11, to distinguish between the short message text 105 and the short message text 205, an identifier indicating "receive" and an identifier indicating "send" may be respectively configured for the short message text 105 and the short message text 205, for example, a label 801 and a label 802. A text corresponding to the label 801 is "receive", and an icon corresponding to the label 801 is a picture indicating "receive". A text corresponding to the label 802 is "send", and an icon corresponding to the label 802 is a picture indicating "send".

It can be understood that the short message text of the first short message and the short message text of the second short message that correspond to the missed call are displayed in the call record of the called party, so that the called party can learn of, by viewing the communication record, the call reason corresponding to the missed call and the call rejection reason corresponding to the missed call, and therefore the called party reviews and processes the missed call.

In some embodiments, for the two call scenarios described in the foregoing (1) and (2), both the call rejection reason (the short message text of the second short message) of the called party and the call reason (the short message text of the first short message) of the calling party may be displayed in a call record on the side of the calling party.

Figure 12:
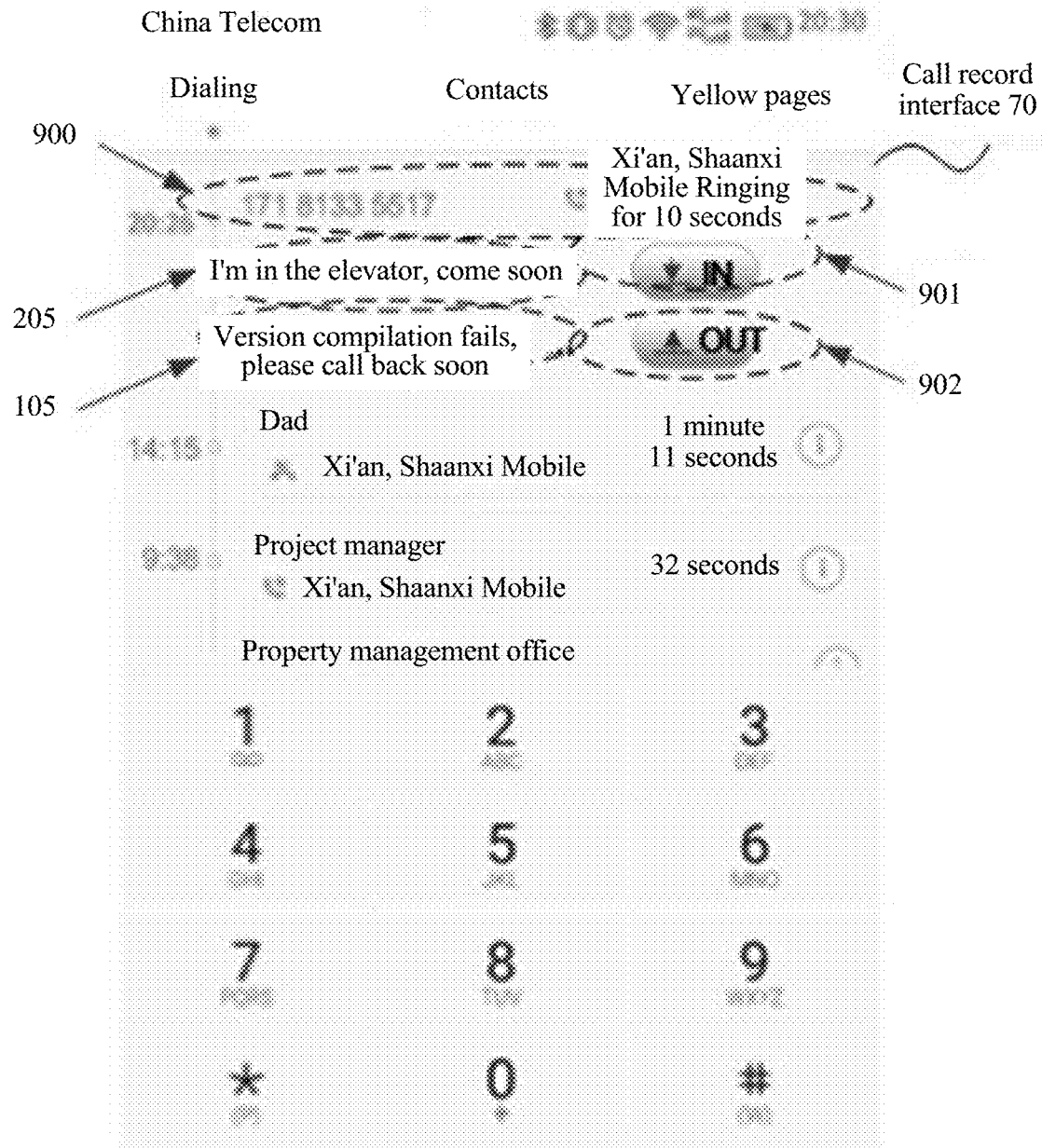
FIG. 12 is a schematic diagram in which a calling party displays a rejected outgoing call, a call rejection reason corresponding to the rejected outgoing call, and a call reason through association in a call record according to an embodiment of the present invention.

For example, as shown in FIG. 12, both the short message text 105 of the first short message and the short message text 205 of the second short message correspond to an outgoing call record 900. In the call record 50 on the side of the calling party, the short message text 105 and the short message text 205 may be displayed in the corresponding outgoing call record 900. As shown in FIG. 12, to distinguish between the short message text 105 and the short message text 205, an identifier indicating "receive" and an identifier indicating "send" may be respectively configured for the short message text 105 and the short message text 205, for example, a label 901 and a label 902. A text corresponding to the label 901 is "receive", and an icon corresponding to the label 901 is a picture indicating "receive". A text corresponding to the label 902 is "send", and an icon corresponding to the label 902 is a picture indicating "send".

It can be understood that the short message text of the first short message and the short message text of the second short message that correspond to the rejected outgoing call are displayed in a communication record of the calling party, so that the calling party can learn of, by viewing the communication record, the call reason corresponding to the rejected outgoing call and the call rejection reason corresponding to the rejected outgoing call, and therefore the calling party reviews and processes the rejected outgoing call.

It should be noted that the phone number of the calling party and the phone number of the called party shown in the accompanying drawings are merely used to clearly and vividly explain the embodiments of the present invention. This shall not be construed as a limitation. UI expression of the short message text of the first short message and the second short message text shown in the accompanying drawings is merely an implementation of the embodiments of the present invention, which may be different in actual application. This shall not be construed as a limitation.

Figure 13:
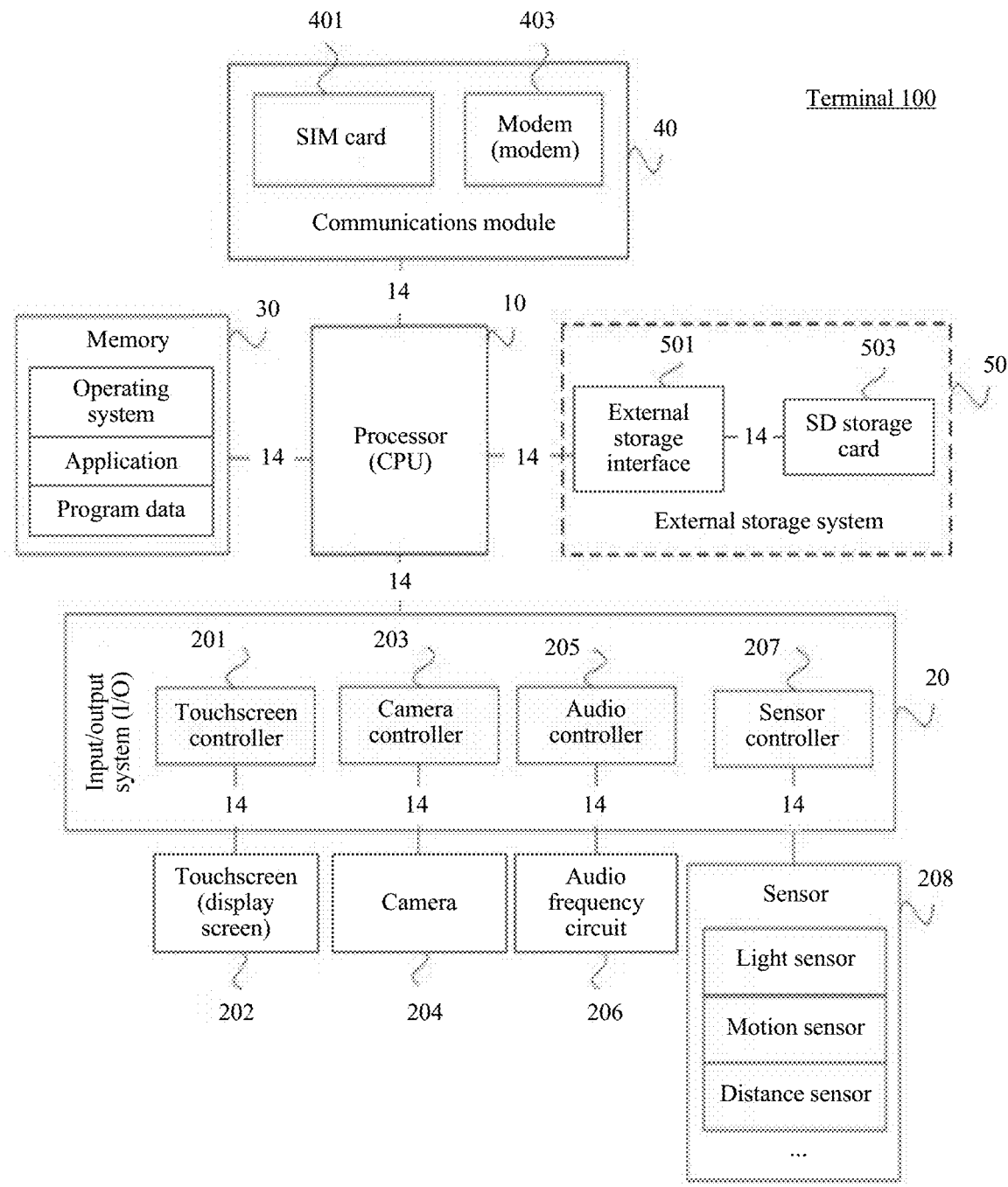
FIG. 13 is a schematic diagram of a hardware architecture of a terminal according to an embodiment of the present invention.

The following describes an implementation of a terminal in an embodiment of the present invention. FIG. 13 is a structural block diagram of an implementation of a terminal 100. The terminal 100 may include but is not limited to a mobile phone, a tablet computer, a wearable device, and an M2M (Machine to Machine) terminal. As shown in FIG. 13, the terminal 100 may include a processor 10, a memory 30 (one or more computer readable storage media), a communications module 40, and an input/output system 20. In some embodiments, the terminal 100 may further include an external storage system 50. These components may communicate with each other by using one or more communications buses 14.

The input/output system 20 is mainly configured to implement a function of interaction between the terminal 100 and a user/an external environment, and mainly includes an input/output apparatus of the terminal 100. In specific implementation, the input/output system 20 may include a touchscreen controller 201, a camera controller 203, an audio controller 205, and a sensor management module 207. All controllers may be respectively coupled to corresponding peripheral devices (a touchscreen 202, a camera 204, an audio frequency circuit 206, and a sensor 208). It should be noted that the input/output system 20 may further include another I/O peripheral.

The processor 10 may include one or more CPUs, a clock module, and a power management module through integration. The clock module is mainly configured to generate a clock required for data transmission and time sequence control for the processor 10. The power management module is mainly configured to provide a stable high-precision voltage for the processor 10, the communications module 40, the input/output system 20, and the like.

The communications module 40 is configured to receive and send a radio frequency signal, and mainly integrates a receiver and a transmitter of the terminal 100. The communications module 40 communicates with a communications network and another communications device by using the radio frequency signal. In specific implementation, the communications module 40 may include but is not limited to an antenna system, an RF transceiver, one or more amplifiers, a tuner, one or more oscillators, a digital signal processor, a CODEC chip, a SIM card, and a storage medium. In some embodiments, the communications module 40 may be implemented on a separate chip.

The memory 30 is coupled to the processor 10, and is configured to store various software programs and/or a plurality of sets of instructions. In specific implementation, the memory 30 may include a high-speed random access memory, or may include a nonvolatile memory, such as one or more magnetic disk storage devices, a flash storage device, or another nonvolatile solid-state storage device. The memory 30 may store an operating system (hereinafter referred to as a system), for example, an embedded operating system such as Android, iOS, Windows, or Linux. The memory 30 may further store a network communications program. The network communications program may be used to communicate with one or more auxiliary devices, one or more terminal devices, and one or more network devices. The memory 30 may further store a user interface program. The user interface program may vividly display content of an application by using a graphical operation interface, and receive, by using an input control such as a menu, a dialog box, or a button, a control operation performed on the application by the user.

The terminal 100 shown in FIG. 13 may be used as the calling party in the foregoing embodiment, or may be used as the called party in the foregoing embodiment.

Figure 14A:
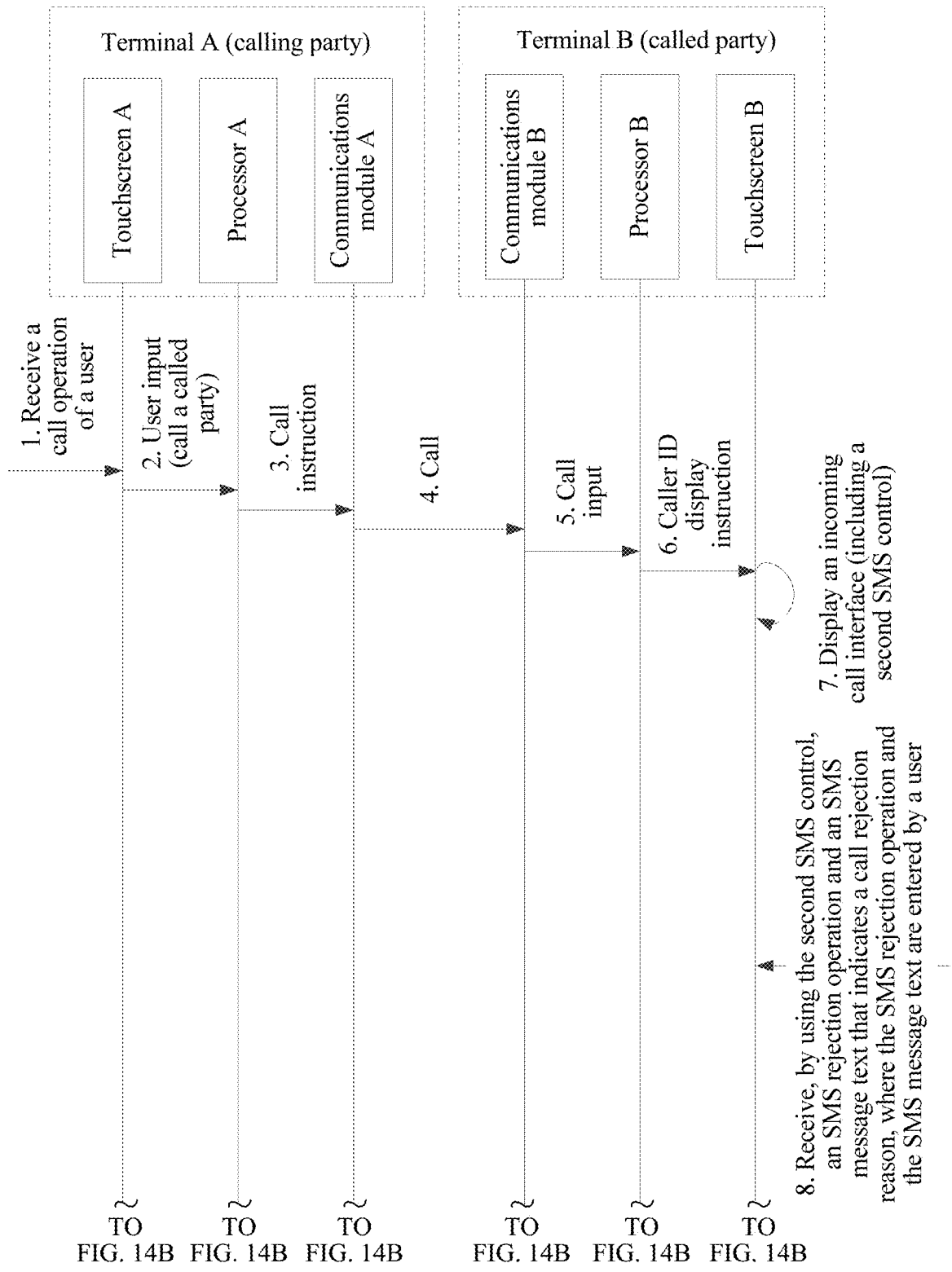
FIG. 14A, FIG. 14B, and FIG. 14C are a schematic diagram of interaction between each component in a calling party terminal described in FIG. 13 and each component in a calling party terminal described in FIG. 13.
Figure 14B:
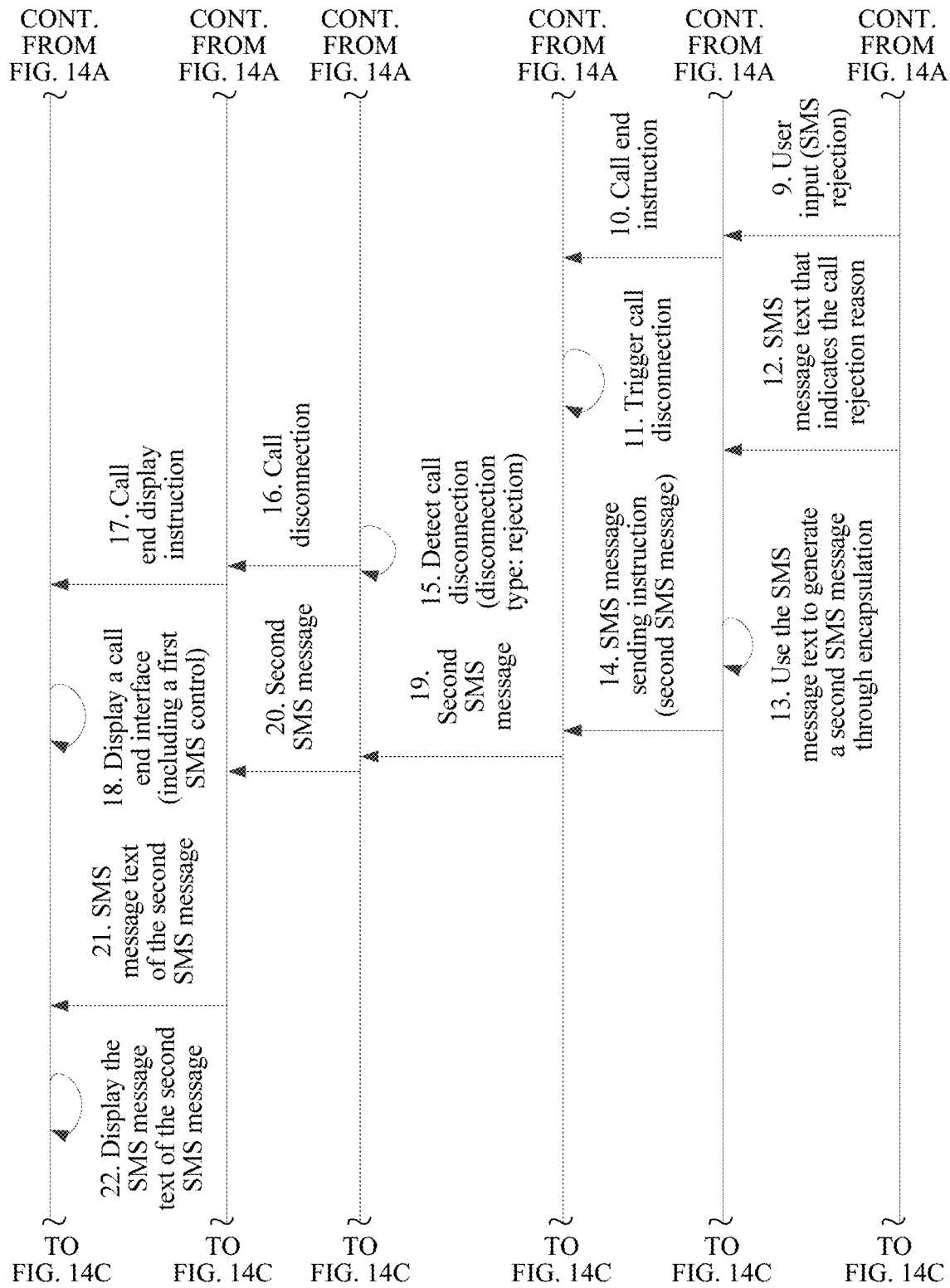
Figure 14C:
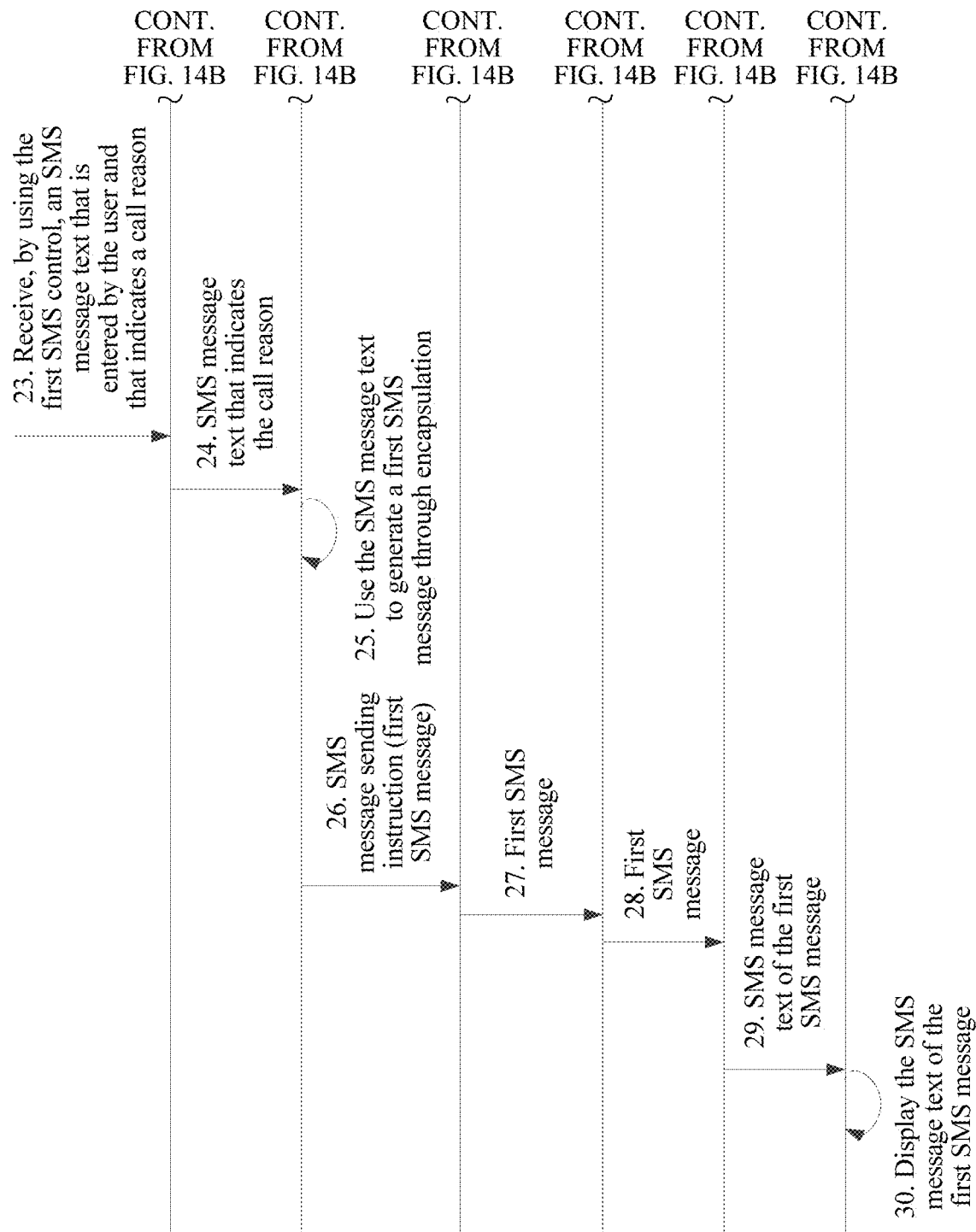

Referring to FIG. 14A, FIG. 14B, and FIG. 14C, the following uses the first case in which the first call scenario and the second call scenario coexist as an example, to describe a cooperation relationship between each component in the calling party terminal and each component in the called party terminal in detail in this embodiment of the present invention. A terminal A is the calling party terminal (including a touchscreen A, a processor A, and a communications module A), and a terminal B is the called party terminal (including a touchscreen B, a processor B, and a communications module B).

1. The touchscreen A receives a call operation entered by a user. Specifically, the call operation may be an operation of triggering to call the called party by the user of the calling party in a dial interface, or may be an operation of triggering to call the called party by the user of the calling party by clicking an item of the called party in a contact list, or may be an operation of calling the called party by the user of the calling party by invoking a call function in another application such as a social application. For a specific form of the call operation, this embodiment of the present invention imposes no limitation.

2. The touchscreen A generates, based on the call operation, user input that indicates calling the called party, and sends the user input to the processor A. In specific implementation, the user input may include a phone number of the called party.

3. The processor A generates a call instruction based on the user input, and sends the call instruction to the communications module A. In specific implementation, the call instruction may include the phone number of the called party.

4. The communications module A receives and responds to the call instruction to initiate a call to the called party.

5. The communications module B receives the call of the calling party, generates call input, and finally sends the call input to the processor B.

6. The processor B sends a display instruction to the touchscreen B based on the call input, so as to trigger the touchscreen B to display an incoming call interface.

7. The touchscreen B responds to the caller ID display instruction to display the incoming call interface. A second SMS control may be displayed in the incoming call interface. For specific implementation of the incoming call interface and the second SMS control, refer to FIG. 5A. Details are not described herein again.

8. The touchscreen B receives, by using the second SMS control, an SMS rejection operation and a short message text that indicates a call rejection reason, where the SMS rejection operation and the short message text are entered by a user. Herein, the SMS rejection operation may be the second input in the embodiment in FIG. 5B. For description of the second input and the short message text that indicates the call rejection reason, refer to FIG. 5B. Details are not described herein again.

9-11. The touchscreen sends, to the processor B based on the SMS rejection operation, user input indicating SMS rejection. Then, the processor B sends a call end instruction to the communications module B based on the user input.

Correspondingly, the communications module B triggers to disconnect the call between the called party and the calling party. In specific implementation, the communications module B may send a call disconnection request to a mobile communications network, and may report to the mobile communications network that a call disconnection type is rejection by the called party. The mobile communications network may disconnect a communication connection between the calling party and the called party, to release communication resources.

12-14. The touchscreen B sends, to the processor B, the short message text that is entered by the user and that indicates the call rejection reason. Then, the processor B uses the short message text to generate a second short message through encapsulation, and sends a short message sending instruction to the communications module B, so as to trigger the communications module B to send the second short message to the calling party.

15-18. The communications module A detects that the call is disconnected, and may learn from the mobile communications network that the call disconnection type is rejection by the called party. Then, the communications module A notifies the processor A of a call disconnection event. The processor A sends a display instruction to the touchscreen A based on the call disconnection event, so as to trigger the touchscreen to display a call end interface. Correspondingly, the touchscreen A responds to the display instruction to display the call end interface. A first SMS control may be displayed in the call end interface. For specific implementation of the call end interface and the first SMS control, refer to FIG. 2B. Details are not described herein again.

19-22. The communications module A receives the second short message sent by the called party, and sends the second short message to the processor A. The processor A may decapsulate the second short message to obtain the short message text of the second short message, and send the short message text of the second short message to the touchscreen A, so as to trigger the touchscreen A to display the short message text. Correspondingly, the touchscreen A displays the short message text of the second short message, namely, the call rejection reason of the called party, so that the calling party can clearly and intuitively learn of the call rejection reason of the called party.

In specific implementation, the touchscreen A may display the short message text of the second short message in the call end interface, or may display the short message text of the second short message in a call record interface. For details, refer to the embodiments in FIG. 6A and FIG. 6B. Details are not described herein again.

23. The touchscreen A receives, by using the first SMS control in the call end interface, a short message text that is entered by the user and that indicates a call reason. Herein, for description of the short message text that indicates the call reason, refer to FIG. 2B. Details are not described herein again.

24. The touchscreen A sends, to the processor A, the short message text that indicates the call reason.

25-27. The processor A uses the short message text to generate a first short message through encapsulation, and sends a short message sending instruction to the communications module A, so as to trigger the communications module A to send the first short message to the called party. Correspondingly, the communications module A sends the first short message to the called party.

28. The communications module B receives the first short message sent by the calling party, and sends the first short message to the processor B.

29. The processor B decapsulates the first short message to obtain the short message text of the first short message, and sends the short message text of the first short message to the touchscreen B.

30. The touchscreen B displays the short message text of the first short message, namely, the call reason of the calling party, so that the called party can clearly and intuitively learn of the call reason of the calling party.

It should be understood that the terminal 100 is merely an example provided in this embodiment of the present invention. In addition, the terminal 100 may include more or fewer components than shown components, or may combine two or more components, or may have different component configurations.

Based on some embodiments shown in FIG. 2 to FIG. 12 and the terminal boo described in the embodiment in FIG. 13, the following describes a call processing method provided in an embodiment of the present invention.

Figure 15:
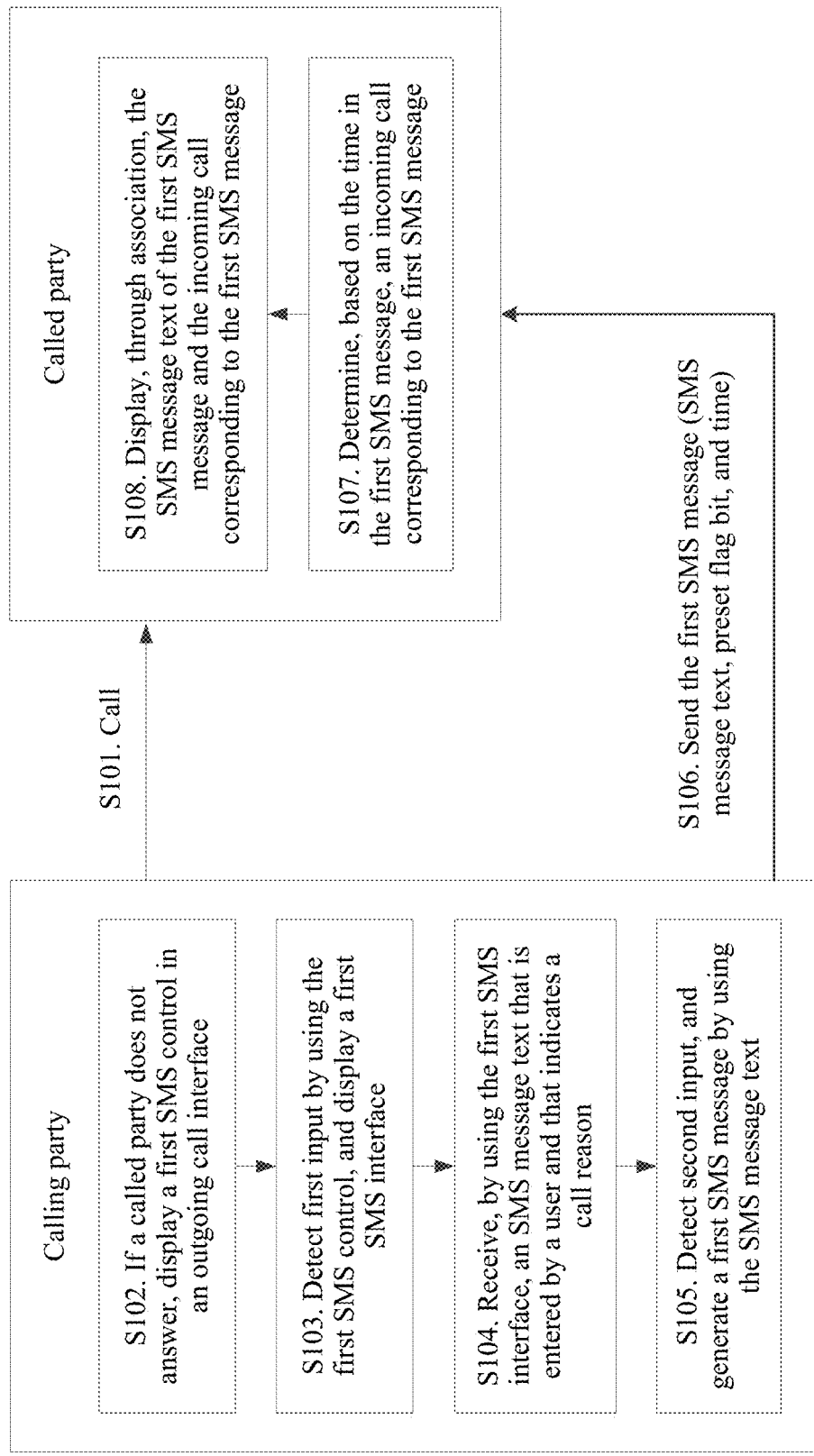
FIG. 15 is a schematic flowchart of a call processing method according to an embodiment of the present invention.

Referring to FIG. 15, FIG. 15 is a schematic flowchart of a call processing method according to an embodiment of the present invention. The embodiment in FIG. 15 corresponds to the first call scenario. To be specific, a calling party calls a called party, the called party does not answer, and the calling party needs to remind the called party to call back as early as possible. The calling party in the embodiment in FIG. 15 may be the terminal 100 shown in FIG. 13 or at least one processor in the terminal 100, and the called party in the embodiment in FIG. 15 may be the terminal 100 shown in FIG. 13 or at least one processor in the terminal 100. The following provides description by using a terminal as an execution body.

S101. The calling party calls the called party. Correspondingly, the called party receives an incoming call of the calling party. In a call process, a call interface presented on a side of the calling party may be referred to as an outgoing call interface, and a call interface presented on a side of the called party may be referred to as an incoming call interface. For details, refer to FIG. 2A.

S102. If the called party does not answer, the calling party terminal displays a first SMS control in the outgoing call interface. In this embodiment of the present invention, the first SMS control may be configured to receive an operation that is entered by a user of the calling party and that is used to open the following first SMS interface. The operation is the following first input. In specific implementation, the first input may be a light touch operation, a pressing operation, a sliding operation, or the like performed on the first SMS control. For a user operation form corresponding to the first input, this embodiment of the present invention imposes no limitation.

In this embodiment of the present invention, that the called party does not answer the call may include the following cases: (1) The called party rejects the call. (2) Duration in which the calling party calls the called party exceeds a time threshold (the time threshold may be referred to as a first time value in this embodiment of the present invention) specified by a mobile communications system (such as a communications gateway). (3) The called party is not online. For example, the called party is engaged in another call. For another example, the called party is in a power-off state. For still another example, the call is automatically forwarded to a voicemail of the called party. It should be noted that, that the called party does not answer the call is not limited to the foregoing several cases. That the called party does not answer the call may further include another case. For example, the call is limited or air channel resources are insufficient.

S103. The calling party terminal detects first input by using the first SMS control, and responds to the first input to display a first SMS interface.

In specific implementation, a listener may be configured for the first SMS control. Once the first input is detected, the first SMS interface is opened. The first SMS interface may be configured to receive a short message text that is entered by the user of the calling party and that indicates a call reason. For details, refer to FIG. 2B.

S104. The calling party terminal receives, by using the first SMS interface, a short message text that is entered by a user and that indicates a call reason. Specifically, there may be a plurality of presentation forms of the first SMS interface. Reference may be made to FIG. 2B and related content description. Details are not described herein again.

S105. The calling party terminal detects second input, and responds to the second input to generate a first short message by using the short message text. Herein, the second input is a user operation used to send the short message text that indicates the call reason. For a user operation form corresponding to the second input, refer to the embodiment in FIG. 2B. Details are not described herein again.

In this embodiment of the present invention, as shown in FIG. 16, the first short message may include the short message text, a preset flag bit, and a time. The preset flag bit may be used to indicate that the short message text of the first short message is the reason why the calling party calls the called party, and the time may be a call-out time at which the calling party calls the called party.

In specific implementation, the preset flag bit may be one bit. In actual application, the preset flag bit may also be a flag bit that includes a plurality of bits, and no limitation is imposed herein.

Figure 17:
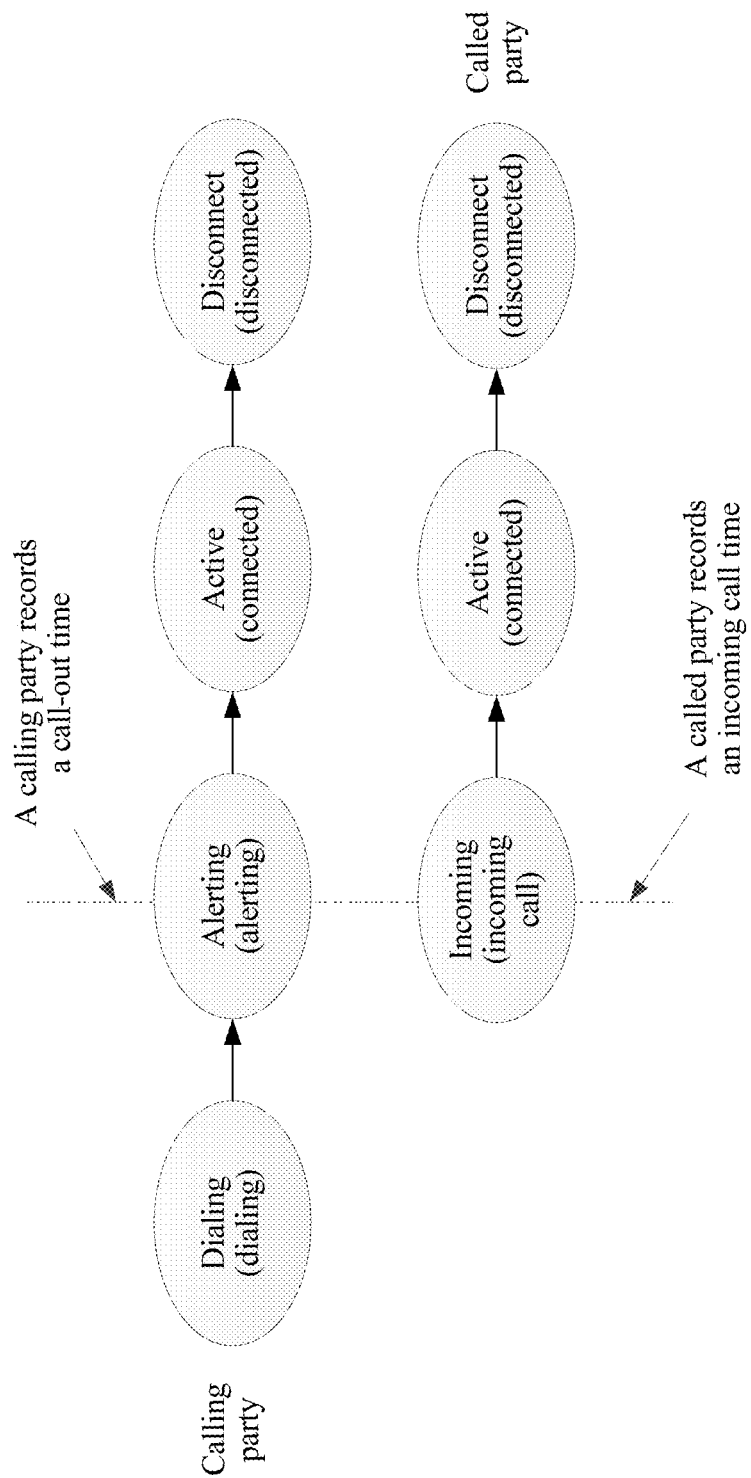
FIG. 17 is a schematic diagram of statuses of a calling party and a called party during a call according to an embodiment of the present invention.

In this embodiment of the present invention, the call-out time in the first short message is the same as an incoming call time on the side of the called party. As shown in FIG. 17, the calling party corresponds to four call states: a dialing state, an alerting (connecting) state, a connected state, and a disconnected state. The called party corresponds to three call states: an incoming call state, a connected state, and a disconnected state. For a same call, a call-out time recorded by the called party is consistent with an incoming call time recorded by the called party. In specific implementation, the calling party may record an initial alerting time as the call-out time.

Not limited to a data format shown in FIG. 16, the first short message may further include another field, for example, an association number. The association number in the first short message may be a phone number of the calling party, so as to indicate that the first short message is from the calling party.

S106. The calling party sends the first short message to the called party. Correspondingly, the called party receives the first short message sent by the calling party.

S107. The called party terminal may determine, based on the time included in the first short message, an incoming call corresponding to the first short message.

In specific implementation, the called party terminal may search an incoming call record of the called party for an incoming call whose incoming call time is consistent with the time in the first short message, and determine that the incoming call is the incoming call corresponding to the first short message. Herein, the incoming call record may include an ended incoming call and an ongoing incoming call.

S108. The called party terminal may display, through association, the short message text of the first short message and the incoming call corresponding to the first short message. In specific implementation, referring to FIG. 3A to FIG. 3C, the called party terminal may display, through association in a lock screen interface, the short message text of the first short message and incoming call information of the incoming call corresponding to the first short message; or may display, through association in a call record interface, the short message text of the first short message and incoming call information of the incoming call corresponding to the first short message; or may display, through association in a system notification interface, the short message text of the first short message and incoming call information of the incoming call corresponding to the first short message.

In some embodiments, that the called party does not answer the call may further include the following case: When duration in which the calling party calls the called party exceeds a second time value, for example, 5 seconds, the called party still does not answer the call. Compared with the first time value, the second time value is smaller. If the duration in which the calling party calls the called party exceeds the first time value, the call immediately ends. If the duration in which the calling party calls the called party exceeds the second time value but does not exceed the first time, the call continues.

In specific implementation, when the duration in which the calling party calls the called party exceeds the second time value, and the called party still does not answer the call, the calling party terminal may display the first SMS control in the outgoing call interface. Therefore, the calling party may open the first SMS interface by using the first SMS control in a call process; enter, in the first SMS interface, the short message text that indicates the call reason; and finally send the first short message to the called party. Correspondingly, the called party receives the first short message, and may determine that the incoming call corresponding to the first short message is the ongoing incoming call. The called party may further display the short message text of the first short message in the incoming call interface, namely, the call reason of the calling party. For details, refer to the embodiment in FIG. 4. Details are not described herein again.

It can be understood that, because the first short message is sent in a process in which the calling party calls the called party, the called party may learn of the call reason of the calling party when receiving the incoming call of the calling party, so that the called party immediately answers the call.

It should be noted that, in this case, the second time value may be set by the calling party terminal by default, or may be set by the calling party in a user-defined manner, or may be intelligently set by the calling party terminal based on a user habit of the calling party. Specially, the second time value may be 0. In other words, it indicates that the calling party may display the first SMS control in the outgoing call interface at an initial moment of calling the called party. Therefore, the calling party may send the first short message when initiating the call to the called party, so that the called party learns of the call reason of the calling party as early as possible, thereby improving a possibility that the called party answers the call in time.

In some embodiments, the calling party terminal may further display, through association in a call record interface, the short message text of the first short message and incoming call information of the incoming call corresponding to the first short message. In other words, the calling party terminal may record and display the call reason why the calling party calls the called party. In specific implementation, to indicate that the short message text of the first short message is sent by the calling party, an identifier that indicates "send" and that corresponds to the short message text may be further displayed. For details, refer to the embodiment in FIG. 7.

It can be understood that recording and displaying the first short message on the side of the calling party can help the calling party manage outgoing call records, so that the calling party reviews call reasons corresponding to all outgoing calls, especially an outgoing call in which a contact name of the called party is not stored (only a phone number is displayed in a call record), and a call reason corresponding to the outgoing call can help the calling party learn of more information about the called party and the outgoing call.

It should be noted that, for content not mentioned in the embodiment in FIG. 15, refer to the embodiments in FIG. 2A, FIG. 2B, FIG. 3A to FIG. 3C, and FIG. 4. Details are not described herein again.

In the embodiment in FIG. 15, the incoming call and the call reason corresponding to the incoming call may be displayed on the side of the called party through association, so that the called party clearly learns of the call reason of the calling party.

Figure 18:
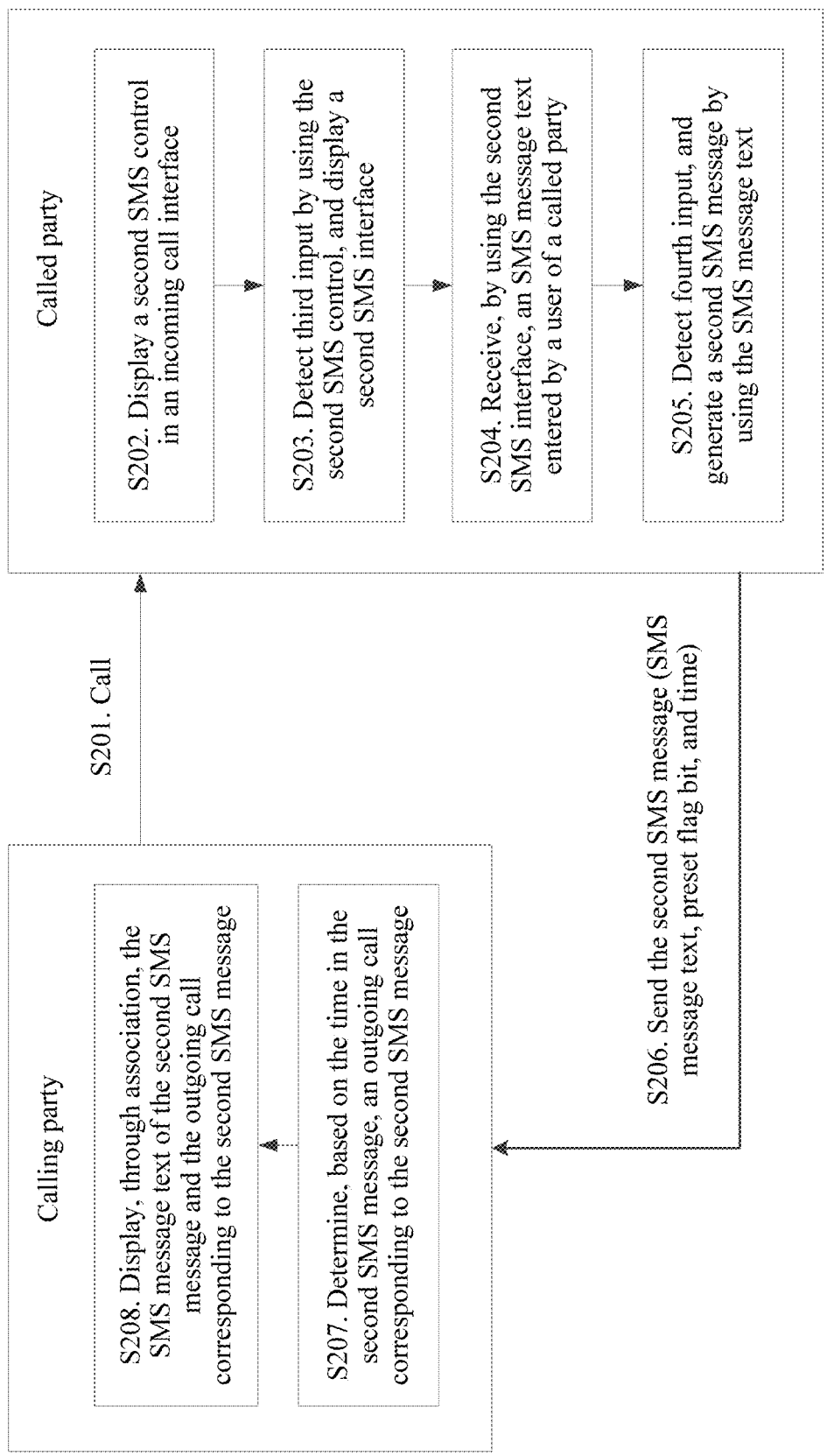
FIG. 18 is a schematic flowchart of another call processing method according to an embodiment of the present invention.

Referring to FIG. 18, FIG. 18 is a schematic flowchart of another call processing method according to an embodiment of the present invention. The embodiment in FIG. 18 corresponds to the second call scenario. To be specific, a calling party calls a called party, the called party rejects the call, and the called party needs to notify the calling party of a call rejection reason. The calling party in the embodiment in FIG. 15 may be the terminal 100 shown in FIG. 13 or at least one processor in the terminal 100, and the called party in the embodiment in FIG. 15 may be the terminal 100 shown in FIG. 13 or at least one processor in the terminal 100. The following provides description by using a terminal as an execution body.

S201. The calling party calls the called party. Correspondingly, the called party receives an incoming call of the calling party. In a call process, a call interface presented on a side of the calling party may be referred to as an outgoing call interface, and a call interface presented on a side of the called party may be referred to as an incoming call interface.

S202. The called party terminal may display a second SMS control in the incoming call interface. For details, refer to FIG. 5A.

In this embodiment of the present invention, the second SMS control may be configured to receive an operation that is entered by a user of the called party and that is used to open the following second SMS interface. The operation is the following third input. In specific implementation, the third input may be a light touch operation, a pressing operation, a sliding operation, or the like performed on the second SMS control. For a user operation form corresponding to the third input, this embodiment of the present invention imposes no limitation.

S203. The called party terminal detects third input by using the second SMS control, and responds to the third input to display a second SMS interface.

In specific implementation, a listener may be configured for the second SMS control. Once the third input is detected, the second SMS interface is opened. The second SMS interface may be configured to receive a call rejection reason that is for rejecting the incoming call and that is entered by the user of the called party. For details, refer to FIG. 5B.

In specific implementation, the third input may be further used to trigger to disconnect the incoming call. In other words, by clicking the second SMS control, the user of the called party may not only open the second SMS interface, but also disconnect the incoming call.

S204. The called party terminal receives, by using the second SMS interface, a short message text entered by a user of the called party. Specifically, there may be a plurality of presentation forms of the second SMS interface. Reference may be made to FIG. 5B and related content description. Details are not described herein again.

S205. The called party terminal detects fourth input, and responds to the fourth input to generate a second short message by using the short message text. Herein, the fourth input is a user operation used to send the short message text that indicates the call rejection reason. For a user operation form corresponding to the fourth input, refer to the embodiment in FIG. 5B. Details are not described herein again.

A data format of the second short message is the same as the data format (referring to FIG. 16) of the first short message described in the embodiment in FIG. 15. The second short message may also include the short message text, a preset flag bit, and a time. The preset flag bit may be used to indicate that the short message text of the second short message is the call rejection reason why the called party rejects the incoming call, and the time may be an incoming call time corresponding to the rejected incoming call.

In this embodiment of the present invention, referring to FIG. 17, the incoming call time in the second short message is the same as a call-out time at which the calling party calls the called party.

Not limited to the data format shown in FIG. 16, the second short message may further include another field, for example, an association number. The association number in the second short message may be a phone number of the called party, so as to indicate that the second short message is from the called party.

S206. The called party sends the second short message to the calling party. Correspondingly, the calling party receives the second short message sent by the called party.

S207. The calling party terminal may determine, based on the time in the second short message, an outgoing call corresponding to the second short message.

In specific implementation, the calling party terminal may search an outgoing call record of the calling party for an outgoing call whose outgoing call time is consistent with the time in the second short message, and determine that the outgoing call is the outgoing call corresponding to the second short message.

S208. The calling party terminal may display, through association, the short message text of the second short message and the outgoing call corresponding to the second short message. In specific implementation, the calling party may display, through association in a call record interface, the short message text of the second short message and outgoing call information of the outgoing call corresponding to the second short message. For details, refer to the embodiment in FIG. 6B. Details are not described herein again. In some embodiments, the calling party may alternatively display the short message text of the second short message in a call end interface of the outgoing call corresponding to the second short message. For details, refer to the embodiment in FIG. 6B. Details are not described herein again.

In some embodiments, the called party may further display, through association in a call record interface, the short message text of the second short message and the incoming call corresponding to the second short message. In other words, the called party may also record and display the call rejection reason why the called party rejects the incoming call. In specific implementation, to indicate that the short message text of the second short message is sent by the called party, an identifier that indicates "send" and that corresponds to the short message text may be further displayed. For details, refer to the embodiment in FIG. 8.

It can be understood that recording and displaying the call rejection reason on the side of the called party can help the called party manage missed call records, so that the calling party reviews call rejection reasons corresponding to all missed calls, especially a missed call in which a contact name of the calling party is not stored (only a phone number is displayed in a call record), and a call rejection reason corresponding to the missed call can help the called party learn of more information about the called party and the outgoing call.

It should be noted that, for content not mentioned in the embodiment in FIG. 18, refer to the embodiments in FIG. 5A, FIG. 5B, FIG. 6A, and FIG. 6B. Details are not described herein again.

In the embodiment shown in FIG. 18, the rejected outgoing call and the call rejection reason corresponding to the rejected outgoing call may be displayed on the side of the calling party through association, so that the calling party clearly learns of the call rejection reason of the called party.

In some embodiments, for a same call, the embodiment in FIG. 15 and the embodiment in FIG. 18 may be combined to be applied to the following call scenarios:

(1) The calling party calls the called party. By using the second SMS control in the incoming call interface, the called party may reject the incoming call from the calling party, and send, to the calling party, the second short message that indicates the call rejection reason, so as to notify the calling party of the call rejection reason. Correspondingly, for the outgoing call rejected by the called party, the calling party may send, to the called party by using the first SMS control in the outgoing call interface, the first short message that indicates the call reason, so as to remind the called party to call back as early as possible.

Figure 19:
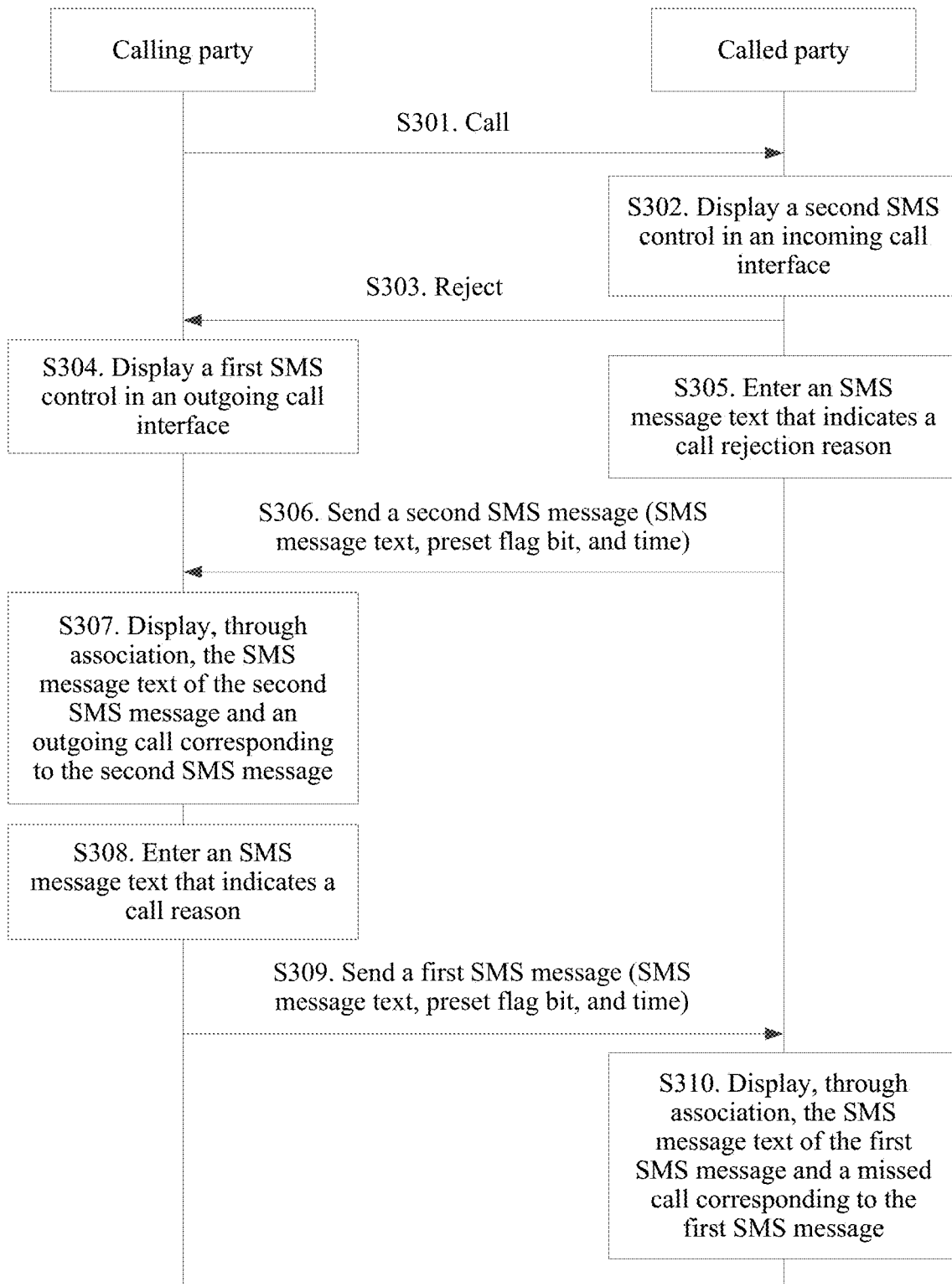
FIG. 19 is a schematic flowchart of still another call processing method according to an embodiment of the present invention.

Specifically, as shown in FIG. 19, an embodiment includes the following steps:

S301. The calling party calls the called party. The call may be referred to as an outgoing call for the calling party, and the call may be referred to as an incoming call for the called party.

S302. The called party displays a second SMS control in an incoming call interface.

S303. The called party rejects the incoming call from the calling party by using the second SMS control. Specifically, referring to S203 in the embodiment in FIG. 18, the third input may also be used to disconnect the incoming call, namely, the foregoing SMS rejection operation. Details are not described herein again.

S304. Correspondingly, the calling party detects that the outgoing call is rejected, and displays a first SMS control in an outgoing call interface.

S305. The called party enters, by using the second SMS control, a short message text that indicates a call rejection reason. For details, refer to S203 and S204 in the embodiment in FIG. 18. Details are not described herein again.

S306. The called party sends a second short message to the calling party. For details, refer to S205 and S206 in the embodiment in FIG. 18. Details are not described herein again.

S307. Correspondingly, the calling party receives the second short message, and displays, through association, the short message text of the second short message and the outgoing call corresponding to the second short message. For details, refer to S207 and S208 in the embodiment in FIG. 18. Details are not described herein again.

S308. The calling party enters, by using the first SMS control, a short message text that indicates a call reason. For details, refer to S103 and S104 in the embodiment in FIG. 15. Details are not described herein again.

S309. The calling party sends a first short message to the called party. For details, refer to S105 and S106 in the embodiment in FIG. 15. Details are not described herein again.

S310. Correspondingly, the called party receives the first short message, and displays, through association, the short message text of the first short message and a missed call corresponding to the first short message. For details, refer to S107 and S108 in the embodiment in FIG. 15. Details are not described herein again.

It should be noted that for content not mentioned in the embodiment in FIG. 19, refer to the embodiment in FIG. 15 or the embodiment in FIG. 18. Details are not described herein again.

(2) The calling party calls the called party, and edits and sends, to the called party in a call process by using the first SMS control in the outgoing call interface, the first short message that indicates the call reason, so as to remind the called party to immediately answer the call. For the incoming call from the calling party, the short message text of the first short message that indicates the call reason is displayed in the incoming call interface, but the called party still rejects the incoming call because of inconvenience, rejects the incoming call from the calling party by using the second SMS control in the incoming call interface, and sends, to the calling party, the second short message that indicates the call rejection reason, so as to notify the calling party of inconvenience of answering the call.

Figure 20:
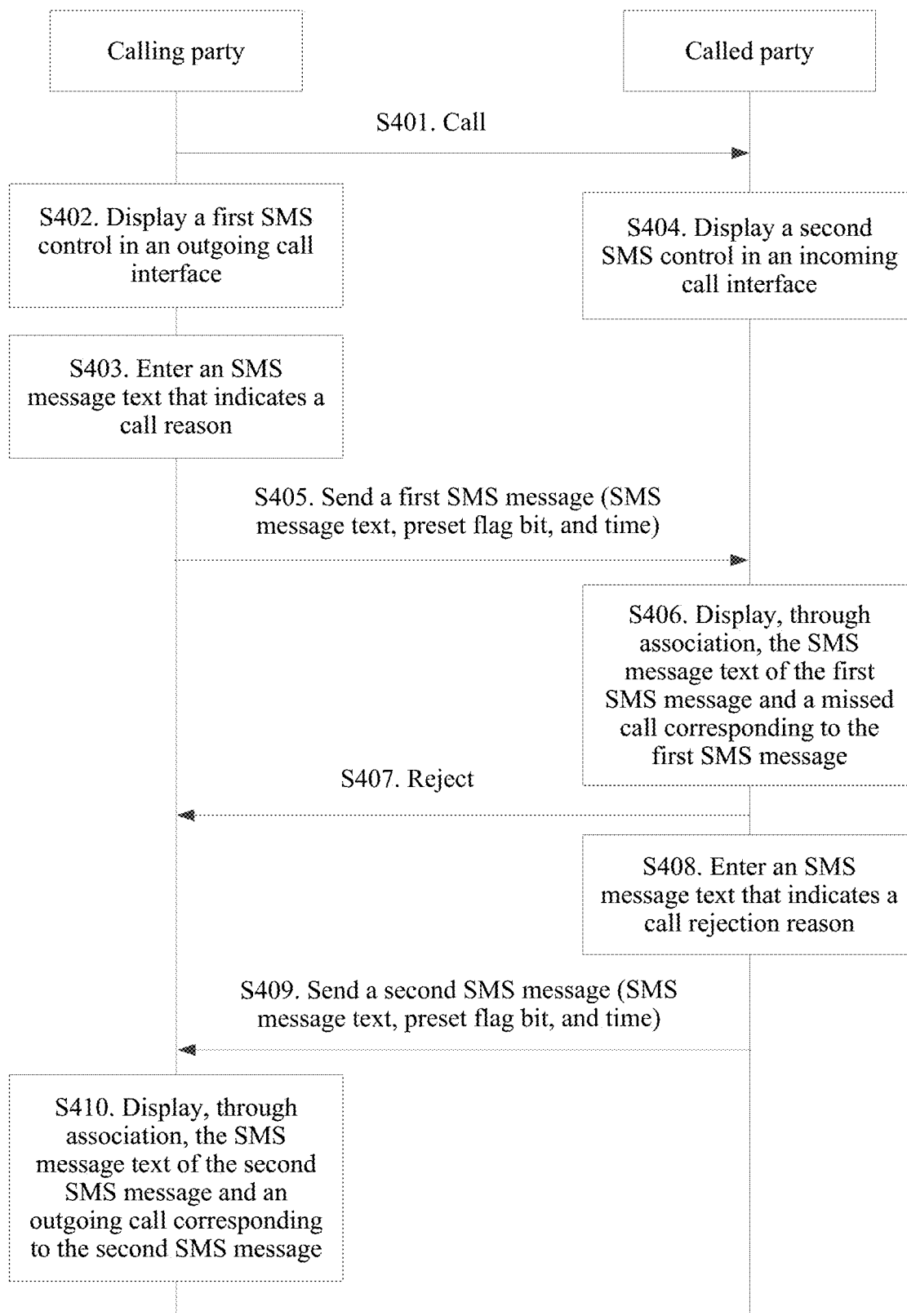
FIG. 20 is a schematic flowchart of yet another call processing method according to an embodiment of the present invention.

Specifically, as shown in FIG. 20, an embodiment includes the following steps:

S401. The calling party calls the called party. The call may be referred to as an outgoing call for the calling party, and the call may be referred to as an incoming call for the called party.

S402. The calling party displays a first SMS control in an outgoing call interface.

S403. After receiving the call of the calling party, the called party may display a second SMS control in an incoming call interface.

S404. The calling party enters, by using the first SMS control, a short message text that indicates a call reason. For details, refer to S103 and S104 in the embodiment in FIG. 15. Details are not described herein again.

S405. The calling party sends a first short message to the called party. For details, refer to S105 and S106 in the embodiment in FIG. 15. Details are not described herein again.

S406. Correspondingly, the called party receives the first short message, and displays, through association, the short message text of the first short message and a missed call corresponding to the first short message. For details, refer to S107 and S108 in the embodiment in FIG. 15. Details are not described herein again.

S407. The called party rejects the incoming call from the calling party by using the second SMS control. Specifically, referring to S203 in the embodiment in FIG. 18, the third input may also be used to disconnect the incoming call, namely, the foregoing SMS rejection operation. Details are not described herein again.

S408. The called party enters, by using the second SMS control, a short message text that indicates a call rejection reason. For details, refer to S203 and S204 in the embodiment in FIG. 18. Details are not described herein again.

S409. The calling party sends a first short message to the called party. For details, refer to S105 and S106 in the embodiment in FIG. 15. Details are not described herein again.

S410. Correspondingly, the calling party receives the second short message, and displays, through association, the short message text of the second short message and the outgoing call corresponding to the second short message. For details, refer to S207 and S208 in the embodiment in FIG. 18. Details are not described herein again.

It should be understood that in the two call scenarios described in the foregoing (1) and (2), the outgoing call is rejected for the calling party, and the incoming call is not answered for the called party.

In some embodiments, for the two call scenarios described in the foregoing (1) and (2), the called party may display both the call reason (the short message text of the first short message) of the calling party and the call rejection reason (the short message text of the second short message) of the called party in a call record. For details, refer to the embodiment in FIG. 11. Details are not described herein again.

It can be understood that the short message text of the first short message and the short message text of the second short message that correspond to the missed call are displayed in a communication record of the called party, so that the called party can learn of, by viewing the communication record, the call reason corresponding to the missed call and the call rejection reason corresponding to the missed call, and therefore the called party reviews and processes the missed call.

In some embodiments, for the two call scenarios described in the foregoing (1) and (2), the calling party may display both the call rejection reason (the short message text of the second short message) of the called party and the call reason (the short message text of the first short message) of the calling party in a call record. For details, refer to the embodiment in FIG. 12. Details are not described herein again.

It can be understood that the short message text of the first short message and the short message text of the second short message that correspond to the rejected outgoing call are displayed in a communication record of the calling party, so that the calling party can learn of, by viewing the communication record, the call reason corresponding to the rejected outgoing call and the call rejection reason corresponding to the rejected outgoing call, and therefore the calling party reviews and processes the rejected outgoing call.

In this embodiment of the present invention, the calling party terminal and the called party terminal may manage, by using a record format shown in the following Table 1, each call record in a call record list.

TABLE 1

| Field | Type | Meaning |
| --- | --- | --- |
| Type | Short integer (Short) | Call type |
| Phone_No | Character string (String) | Association number |
| Num of Calls | Integer (Int) | Quantity of calls |
| Location | Character string (String) | Telecommunications home location |
| Time | DateTime | Call-out time/Incoming call time |
| Call Duration | Long integer (Long) | Call duration |
| Msg | Character string (String) | Call reason/Call rejection reason |

A field "Type" may indicate a call type, which may specifically include: an answered outgoing call (calling party), a missed outgoing call (calling party), an answered incoming call (called party), and a missed call (called party). In specific implementation, the foregoing four different call types may be represented by using different integer values. A field "Phone No" indicates an association number. Specifically, for an incoming call record on a side of the called party, the association number is a phone number of the calling party; and for an outgoing call record on a side of the calling party, the association number is a phone number of the called party. A field "Call Duration" indicates call duration. For a missed call on the side of the called party or for a missed outgoing call on the side of the calling party, the call duration may be duration in which the call lasts. A field "Msg" indicates a short message text associated with a call record. Specifically, for a missed call on the side of the called party, the field "Msg" may be a call reason corresponding to the missed call; and for a rejected outgoing call on the side of the calling party, the field "Msg" may be a call rejection reason corresponding to the rejected outgoing call. In some embodiments, the field "Msg" may alternatively include two pieces of content: the call rejection reason and the call reason, and the two pieces of content may be distinguished by using a separator.

It should be noted that Table 1 is merely an implementation of the embodiment of the present invention, which may be different in actual application. This shall not be construed as a limitation.

Figure 21:
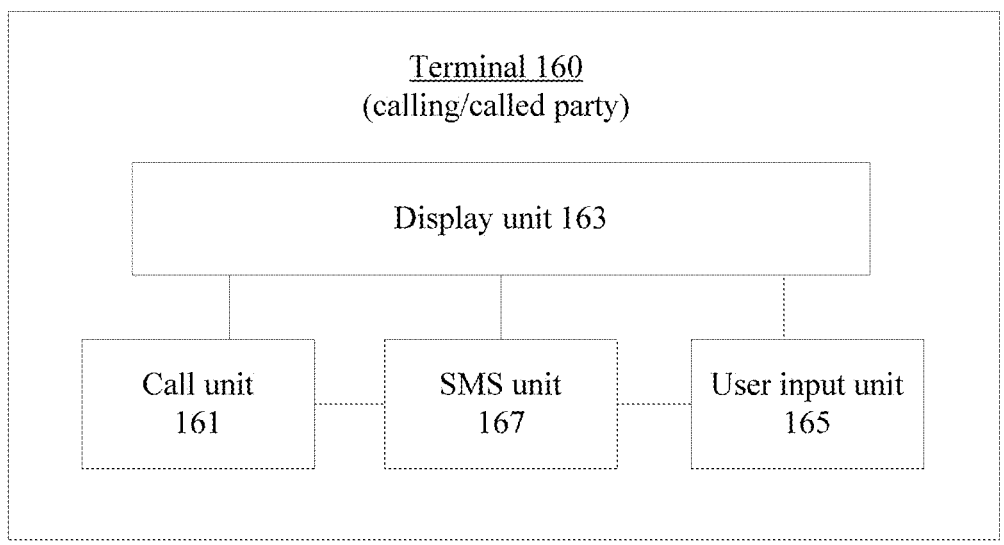
FIG. 21 is a schematic structural diagram of a terminal according to an embodiment of the present invention.

FIG. 21 is a structural block diagram of another implementation of a terminal according to an embodiment of the present invention. A terminal 160 shown in FIG. 21 may be used as the calling party in the foregoing embodiment, or may be used as the called party in the foregoing embodiment. As shown in FIG. 21, the terminal 160 may include a display unit 163, a call unit 161, an SMS unit 167, and a user input unit 165.

When the terminal 160 is the calling party in the foregoing embodiment, implementation of each function unit may be as follows:

The call unit 161 may be configured to call a called party.

The display unit 163 may be configured to: if the called party does not answer, display a first SMS control in an outgoing call interface.

The user input unit 165 may be configured to receive first input by using the first SMS control.

The display unit 163 may be further configured to, for example, respond to the first input to display a first SMS interface.

The user input unit 165 may be further configured to receive, by using the first SMS interface, a short message text entered by a user.

The user input unit 165 may be further configured to detect second input.

The SMS unit 167 may be configured to: respond to the second input to generate a first short message by using the short message text; and send the first short message to the called party.

Specifically, the first short message may include the short message text, a preset flag bit, and a time. The preset flag bit in the first short message is used to indicate that the short message text of the first short message is a reason why the calling party calls the called party. The time in the first short message is a call-out time at which the calling party calls the called party.

In some embodiments, the display unit 163 may be further configured to display, through association in a call record interface, the short message text of the first short message and an outgoing call corresponding to the first short message.

When the called party rejects the call, the SMS unit 167 may be further configured to receive a second short message sent by the called party. Then, the display unit 163 may be further configured to display, through association, a short message text of the second short message and the outgoing call corresponding to the second short message. For how to display, through association, the short message text of the second short message and the outgoing call corresponding to the second short message, refer to the foregoing embodiment. Details are not described herein again.

Specifically, the second short message may include the short message text, a preset flag bit, and a time. The preset flag bit in the second short message is used to indicate that the short message text of the second short message is a call rejection reason why the called party rejects the incoming call. The time in the second short message is an incoming call time corresponding to the incoming call.

It can be understood that when the terminal 160 is used as the calling party in the foregoing embodiment, for implementation of each function unit in the terminal 160, refer to a function of the calling party in the foregoing embodiment. Details are not described herein again.

When the terminal 160 is the called party in the foregoing embodiment, implementation of each function unit may be as follows:

The call unit 161 may be configured to receive an incoming call of a calling party.

The display unit 163 may be configured to display a second SMS control in an incoming call interface.

The user input unit 165 may be configured to detect third input by using the second SMS control.

The display unit 163 may be further configured to respond to the third input to display a second SMS interface.

The user input unit 165 may be further configured to receive, by using the second SMS interface, a short message text entered by a user of the called party.

The user input unit 165 may be further configured to detect fourth input.

The SMS unit 167 may be configured to: respond to the fourth input to generate a second short message by using the short message text; and send the second short message to the calling party.

Specifically, the second short message may include the short message text, a preset flag bit, and a time. The preset flag bit in the second short message is used to indicate that the short message text of the second short message is a call rejection reason why the called party rejects the incoming call. The time in the second short message is an incoming call time corresponding to the incoming call.

In some embodiments, the display unit 163 may be further configured to display, through association in a call record interface, the short message text of the second short message and the incoming call corresponding to the second short message.

In some embodiments, the SMS unit 167 may be further configured to receive a first short message sent by the calling party. The display unit 163 may be further configured to display, through association, a short message text of the first short message and the incoming call corresponding to the first short message. For how to display, through association, the short message text of the first short message and the incoming call corresponding to the first short message, refer to the foregoing embodiment. Details are not described herein again.

Specifically, the first short message may include the short message text, a preset flag bit, and a time. The preset flag bit in the first short message is used to indicate that the short message text of the first short message is a reason why the calling party calls the called party. The time in the first short message is a call-out time at which the calling party calls the called party.

It can be understood that when the terminal 160 is used as the called party in the foregoing embodiment, for implementation of each function unit in the terminal 160, refer to a function of the called party in the foregoing embodiment. Details are not described herein again.

In addition, an embodiment of the present invention further provides a communications system, and the communications system may include a calling party and a called party. In specific implementation, the calling party may be the terminal 100 that is used as the calling party and that is described in the embodiment in FIG. 13, and the called party may be the terminal 100 that is used as the called party and that is described in the embodiment in FIG. 13. Alternatively, the calling party may be the terminal 160 that is used as the calling party and that is described in the embodiment in FIG. 21, and the called party may be the terminal 160 that is used as the called party and that is described in the embodiment in FIG. 21. In actual application, the calling party and the called party may be respectively the calling party and the called party mentioned in the foregoing method embodiment.

In conclusion, in the embodiments of the present invention, the incoming call and the call reason corresponding to the incoming call can be displayed on the side of the called party through association, thereby intuitively and clearly presenting the call reason of the calling party. In addition, the rejected outgoing call and the call rejection reason corresponding to the rejected outgoing call can be displayed on the side of the calling party through association, thereby intuitively and clearly presenting the call rejection reason of the called party.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, an optical memory, and the like) that include computer-usable program code.

The present invention is described according to flowcharts and/or block diagrams of methods, devices (systems), and computer program products provided in embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

The invention claimed is:

1. A terminal, comprising:
a processor;
a non-transitory computer readable storage medium storing a program to be executed by the processor;
a transmitter, configured to attempt to call a called party; and
a display screen, configured to:
in response to the called party not answering the call, display a short message control in an outgoing call interface;
receive a first input using the short message control;
respond to the first input by displaying a short message interface;
receive, using the short message interface, a short message text entered by a user of a calling party; and
detect a second input;
wherein the program includes instructions for:
responding to the second input by generating a short message using the short message text, wherein the short message comprises the short message text, a preset flag bit, and a time, and wherein the preset flag bit indicates that the short message text of the short message is a reason why the calling party attempted to call the called party, and the time is a call-out time at which the calling party attempted to call the called party; and
wherein the transmitter is further configured to send the short message to the called party.

2. The terminal according to claim 1, wherein the called party not answering the call comprises:
the called party rejecting the call; or
a duration in which the calling party attempts to call the called party exceeding a time value; or
the called party not being online.

3. The terminal according to claim 1, wherein the display screen is further configured to:
display, through an association in a call record interface, the short message text of the short message and an outgoing call corresponding to the short message.

4. The terminal according to claim 1, wherein the short message text of the short message comprises a keyword, and the keyword is used to receive a user operation to open an application corresponding to the keyword.

5. A terminal, comprising:
a processor;
a receiver;
a non-transitory computer readable storage medium storing a program to be executed by the processor; and
a display screen;
wherein the receiver is configured to:
receive a short message sent by a calling party, wherein the short message comprises a short message text, a preset flag bit, and a time, and wherein the preset flag bit indicates that the short message text of the short message is a reason why the calling party attempted to call a called party, and the time is a call-out time at which the calling party attempted to call the called party;
wherein the program includes instructions for determining, based on the time comprised in the short message, an incoming call corresponding to the short message; and
wherein the display screen is configured to display, through an association, the short message text of the short message and the incoming call corresponding to the short message.

6. The terminal according to claim 5, wherein the display screen is configured to:
display, through an association in a lock screen interface, the short message text of the short message and incoming call information of the incoming call corresponding to the short message;
display, through an association in a call record interface, the short message text of the short message and incoming call information of the incoming call corresponding to the short message; or
display, through an association in a system notification interface, the short message text of the short message and incoming call information of the incoming call corresponding to the short message.

7. The terminal according to claim 5, wherein the display screen is configured to:
display the short message text of the short message in a caller ID display interface of the incoming call corresponding to the short message.

8. The terminal according to claim 5, wherein the program further includes instructions for:
searching an incoming call record for an incoming call whose incoming call time is consistent with the time in the short message, and determine that a found incoming call corresponds to the short message.

9. The terminal according to claim 5, wherein the short message text of the short message comprises a keyword, and the keyword is used to receive a user operation to open an application corresponding to the keyword.

10. A terminal, comprising:
a processor;
a receiver;
a transmitter;
a non-transitory computer readable storage medium storing a program to be executed by the processor; and
a display screen;
wherein the receiver is configured to receive an incoming call of a calling party;
wherein the display screen is configured to:

display a short message control in an incoming call interface;

detect a first input using the short message control, and respond to the first input to display a short message interface;

receive, using the short message interface, an short message text entered by a user of a called party; and detect a second input;

wherein the program includes instructions for:

responding to the second input to generate a short message using the short message text, wherein the short message comprises the short message text, a preset flag bit, and a time, the preset flag bit indicates that the short message text of the short message is a call rejection reason why the user of the called party rejects the incoming call, and the time is an incoming call time corresponding to the incoming call; and wherein the transmitter is configured to send the short message to the calling party.

11. The terminal according to claim 10, wherein the processor is configured to respond to the first input to disconnect the incoming call.

12. The terminal according to claim 10, wherein the display screen is further configured to display, through an association in a call record interface, the short message text of the short message and the incoming call corresponding to the short message.

13. A terminal, comprising:

a receiver, configured to receive a short message sent by a called party, wherein the short message comprises a short message text, a preset flag bit, and a time, the preset flag bit indicates that the short message text of the short message is a reason why the called party rejects an incoming call, and the time is an incoming call time corresponding to the incoming call;

a display screen;

a processor; and a non-transitory computer readable storage medium storing a program to be executed by the processor, wherein the program includes instructions for:

determining, based on the time in the short message, an outgoing call corresponding to the short message; and wherein the display screen is configured to display, through an association, the short message text of the short message and the outgoing call corresponding to the short message.

14. The terminal according to claim 13, wherein the display screen is configured to:

display the short message text of the short message in an outgoing call interface, wherein the outgoing call interface is configured to display the outgoing call corresponding to the short message; or display, through an association in a call record, the short message text of the short message and the outgoing call corresponding to the short message.

15. The terminal according to claim 13, wherein the program further includes instructions for:

searching an outgoing call record for an outgoing call whose outgoing call time is consistent with the time in the short message; and determining that the found outgoing call corresponds to the short message.

* * * * *